March 22, 1966 R. NOUEL 3,241,192
REGULATING APPARATUS FOR MOLDING PLASTICS
Filed June 18, 1963 10 Sheets-Sheet 1
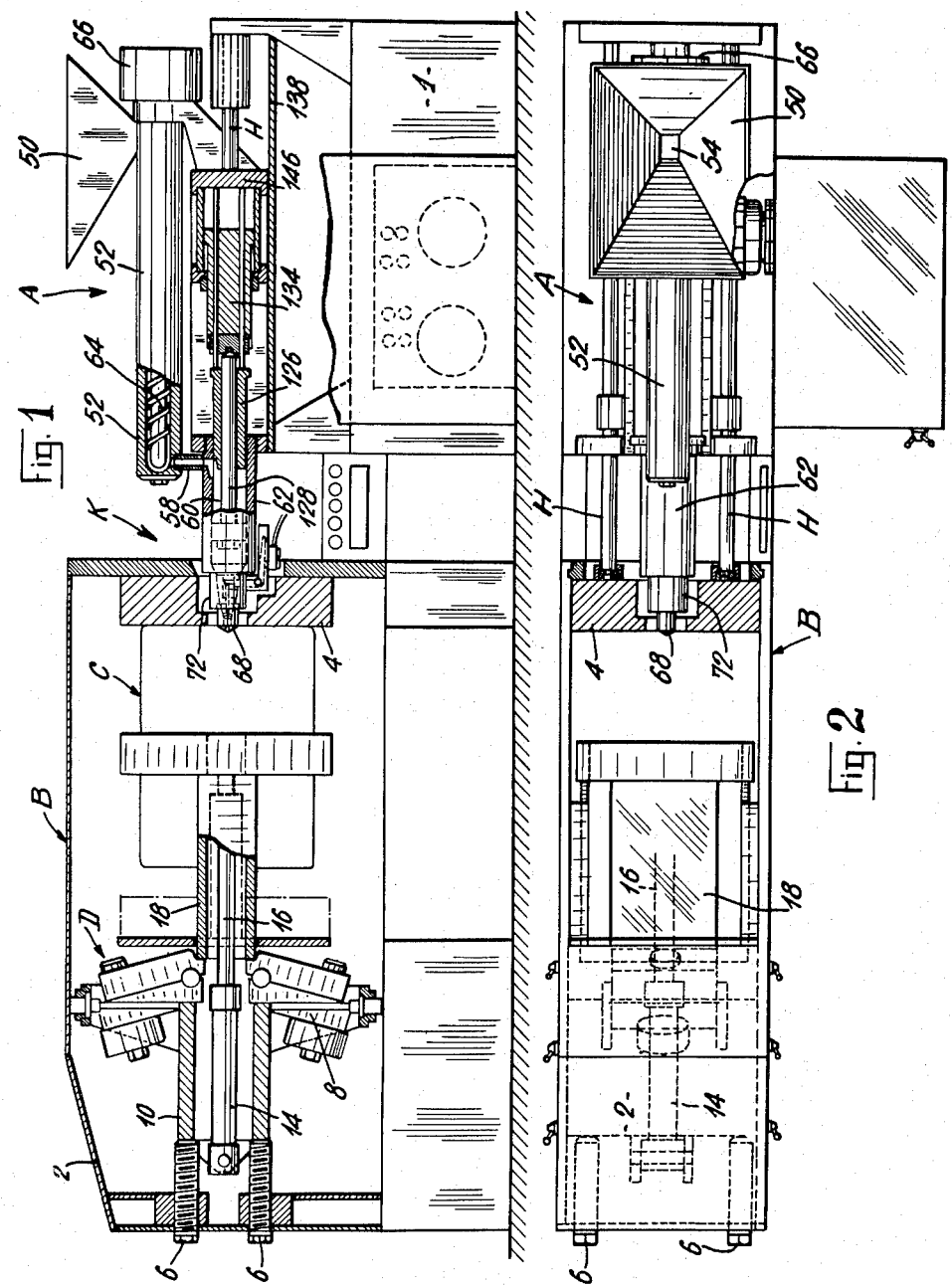

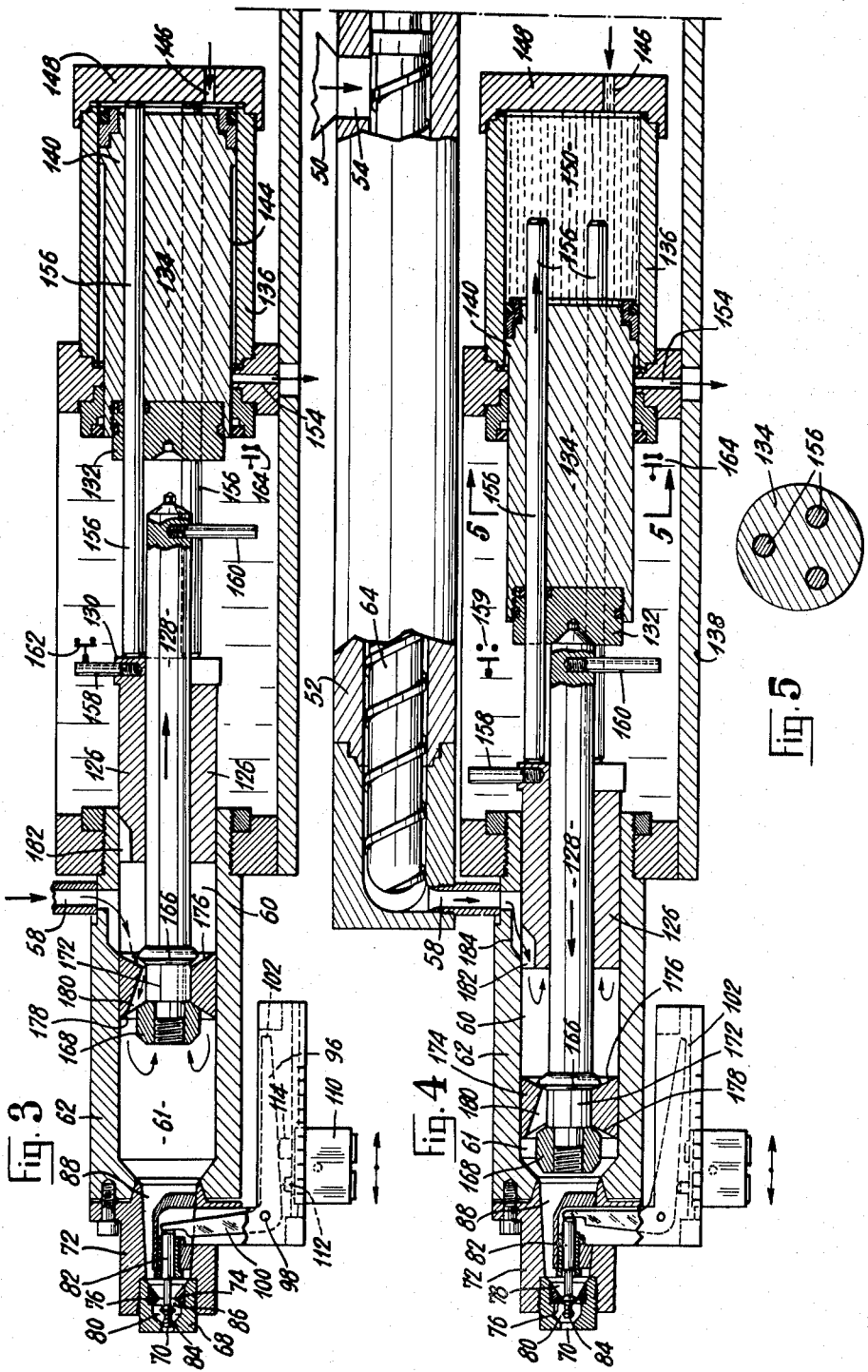

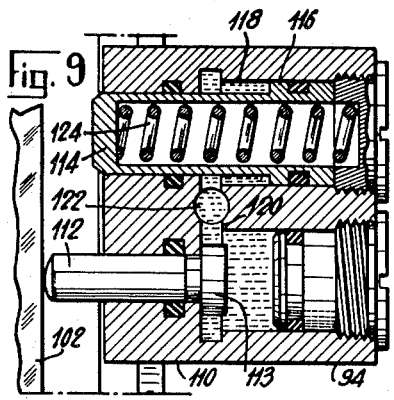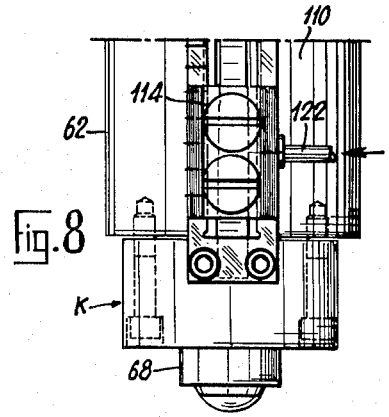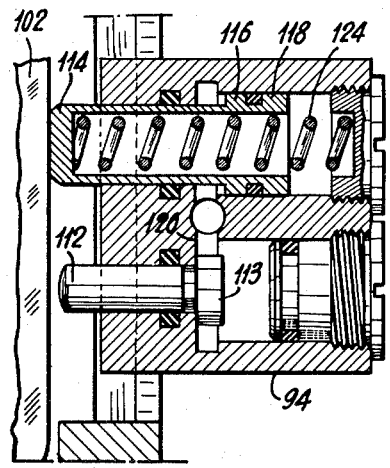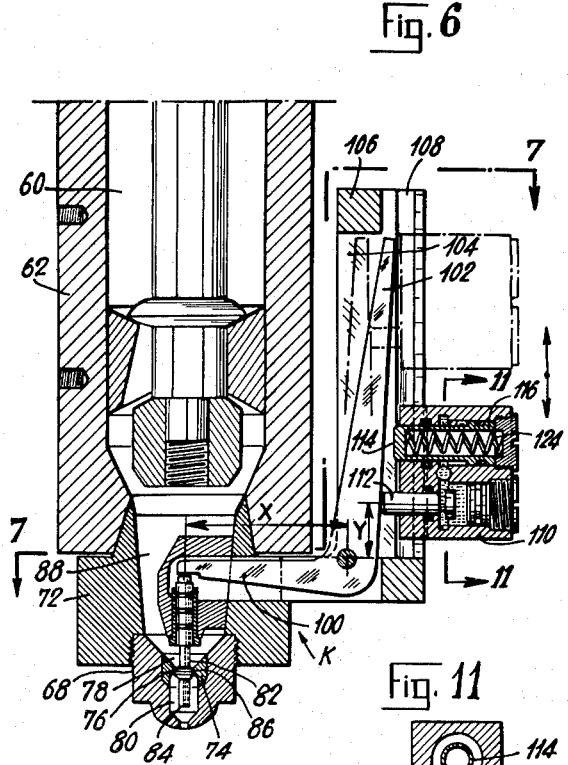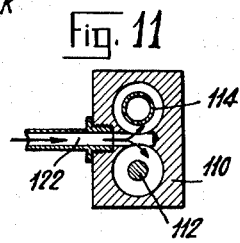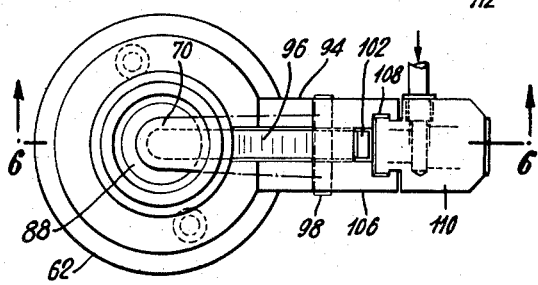

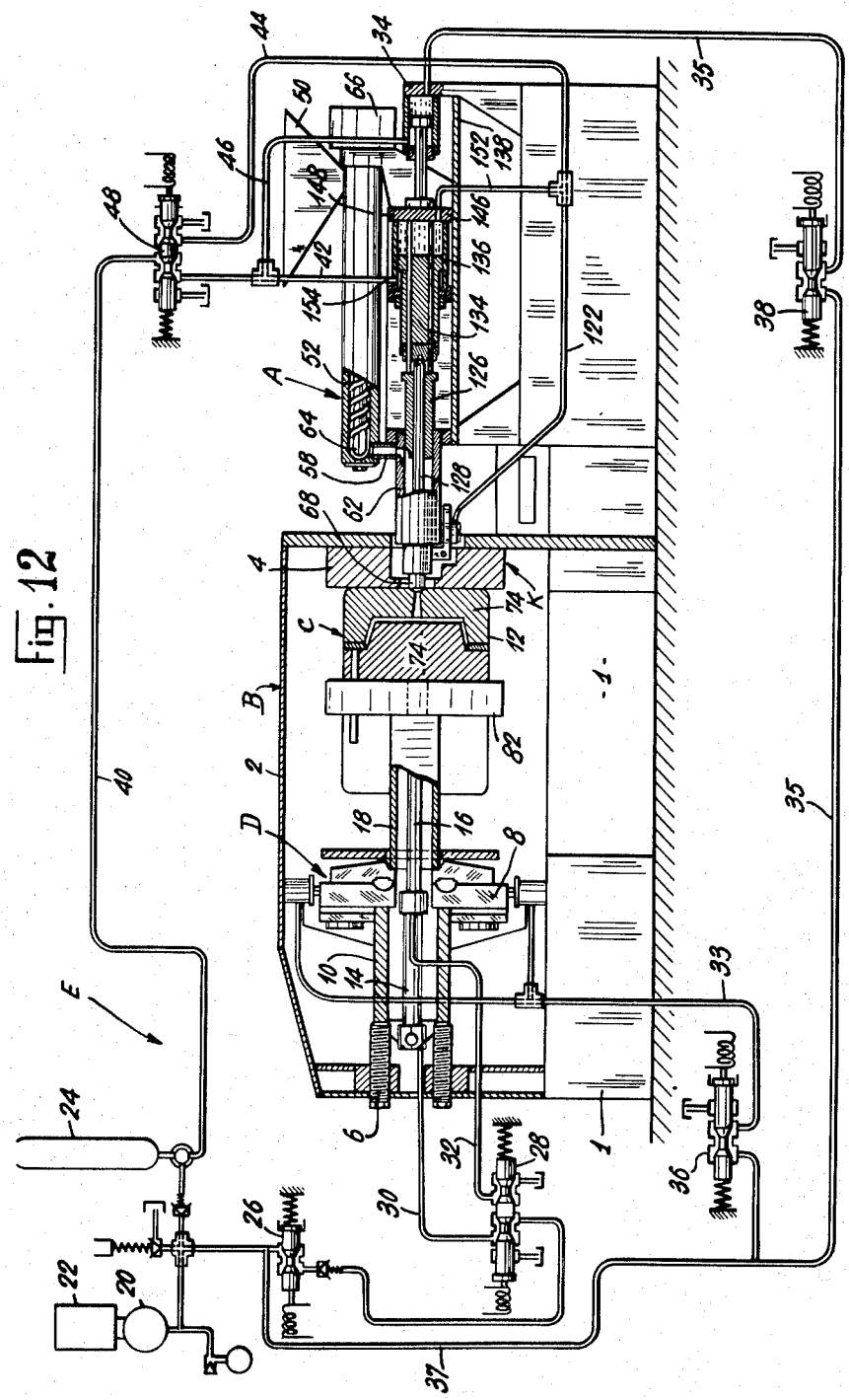

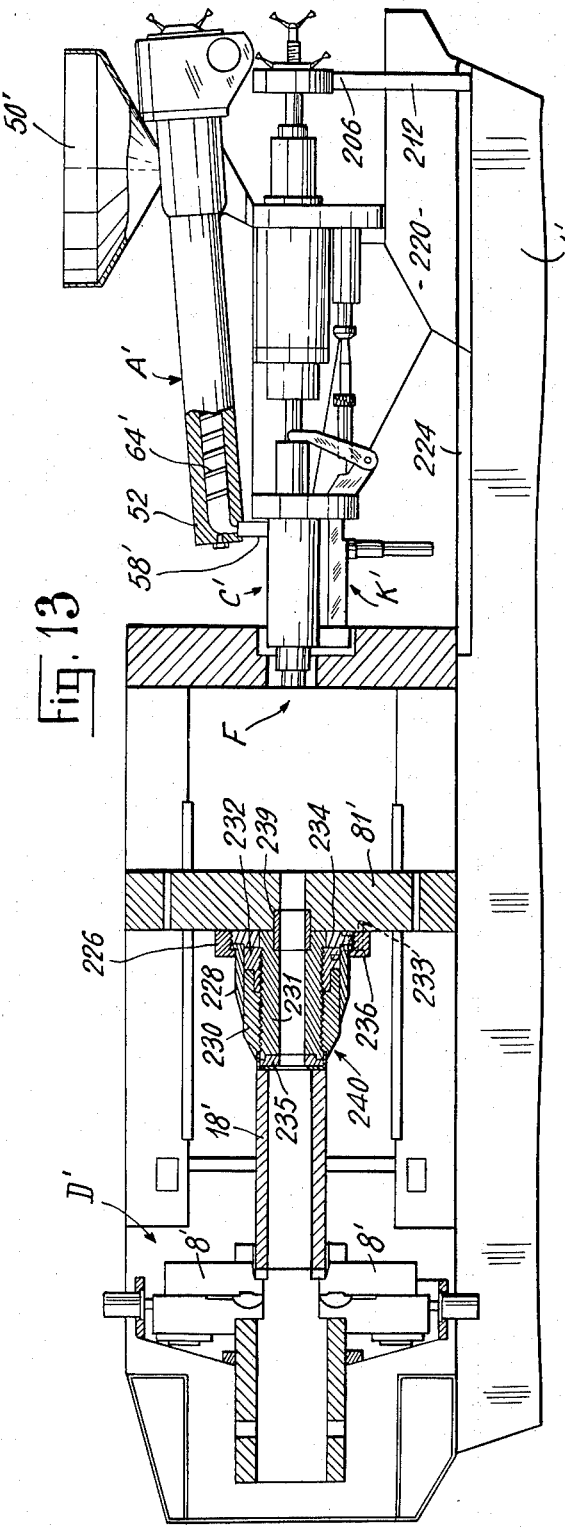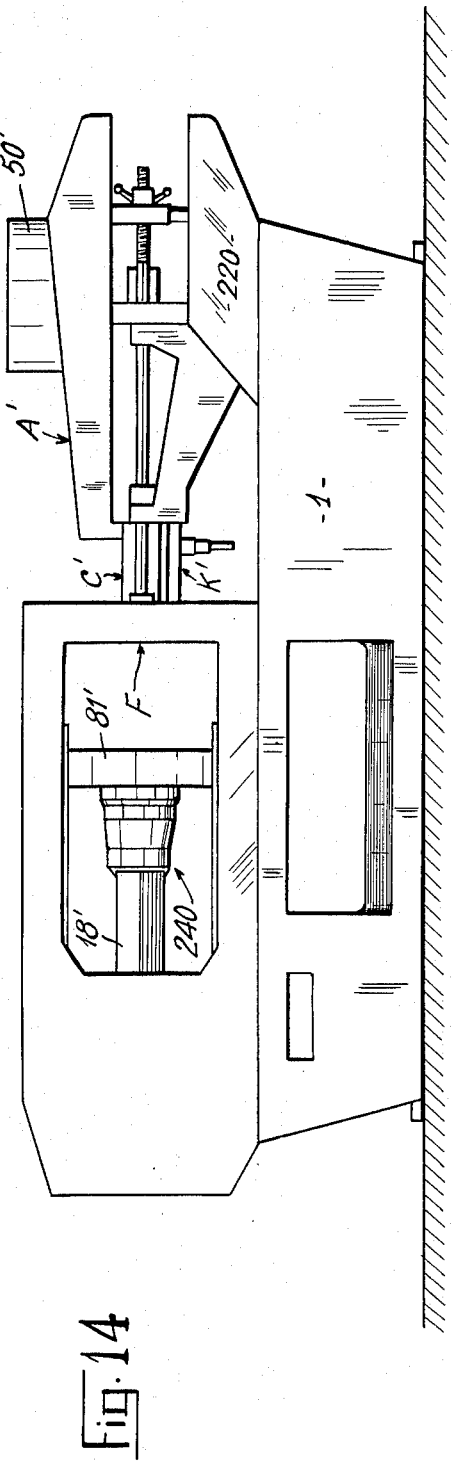

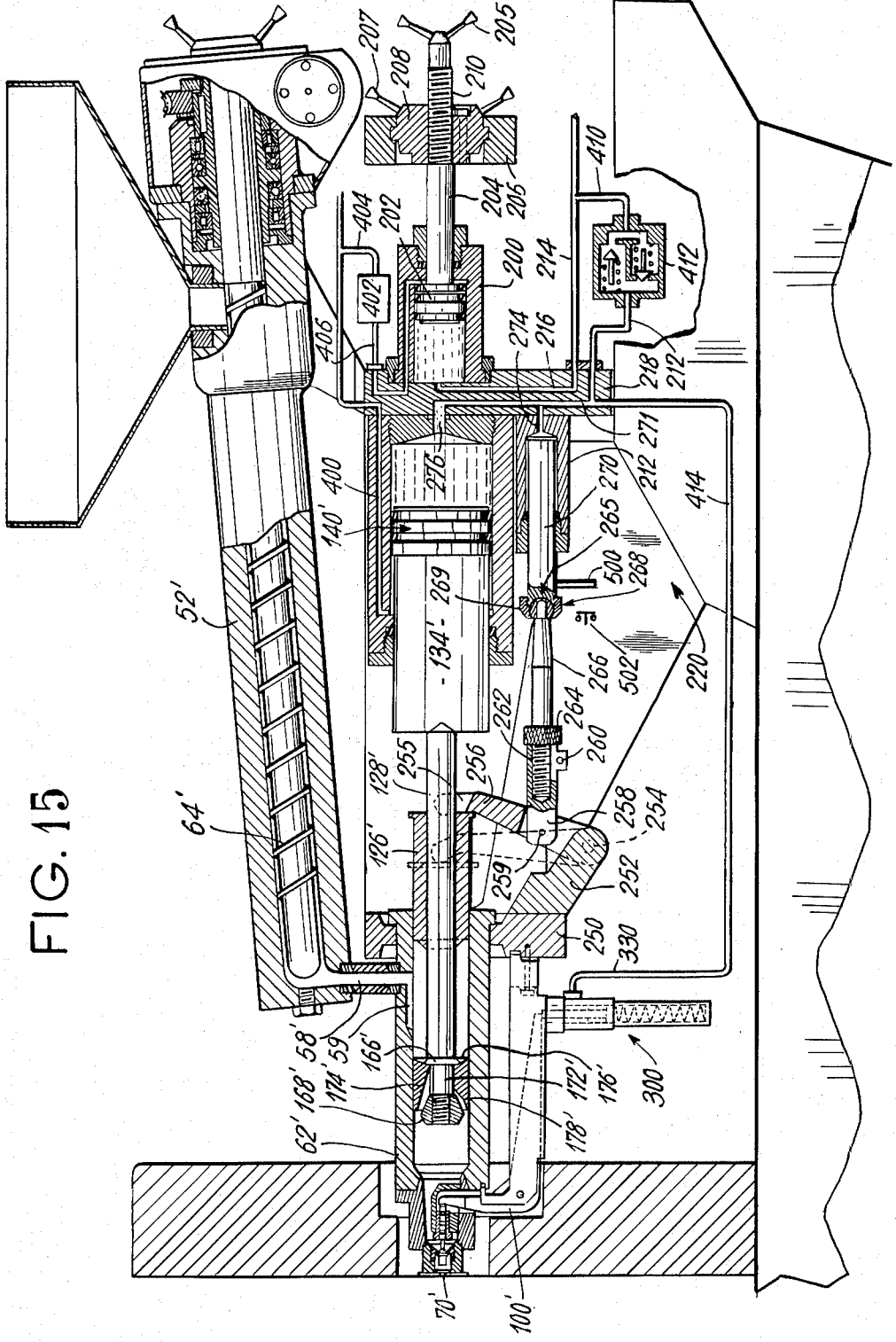

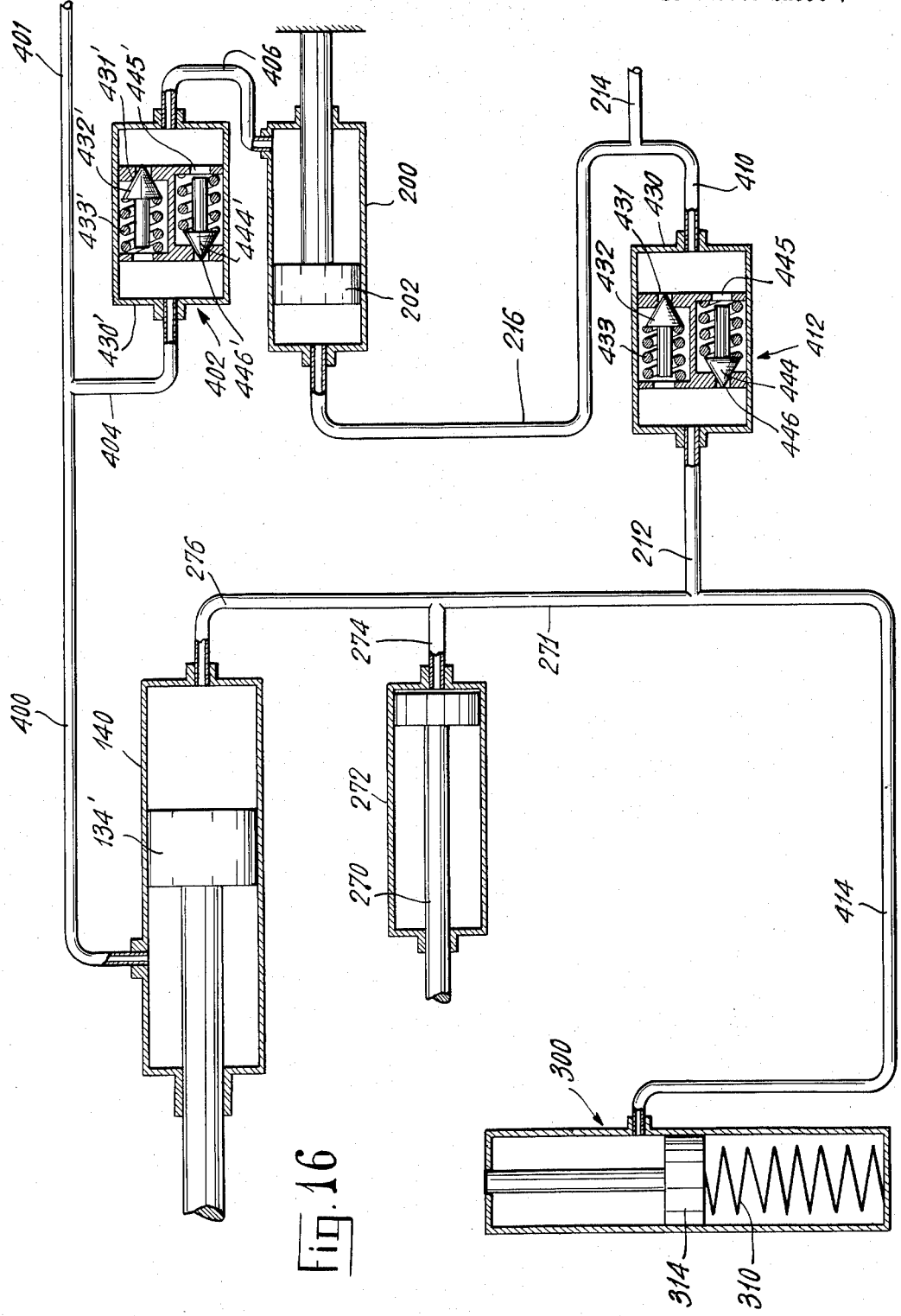

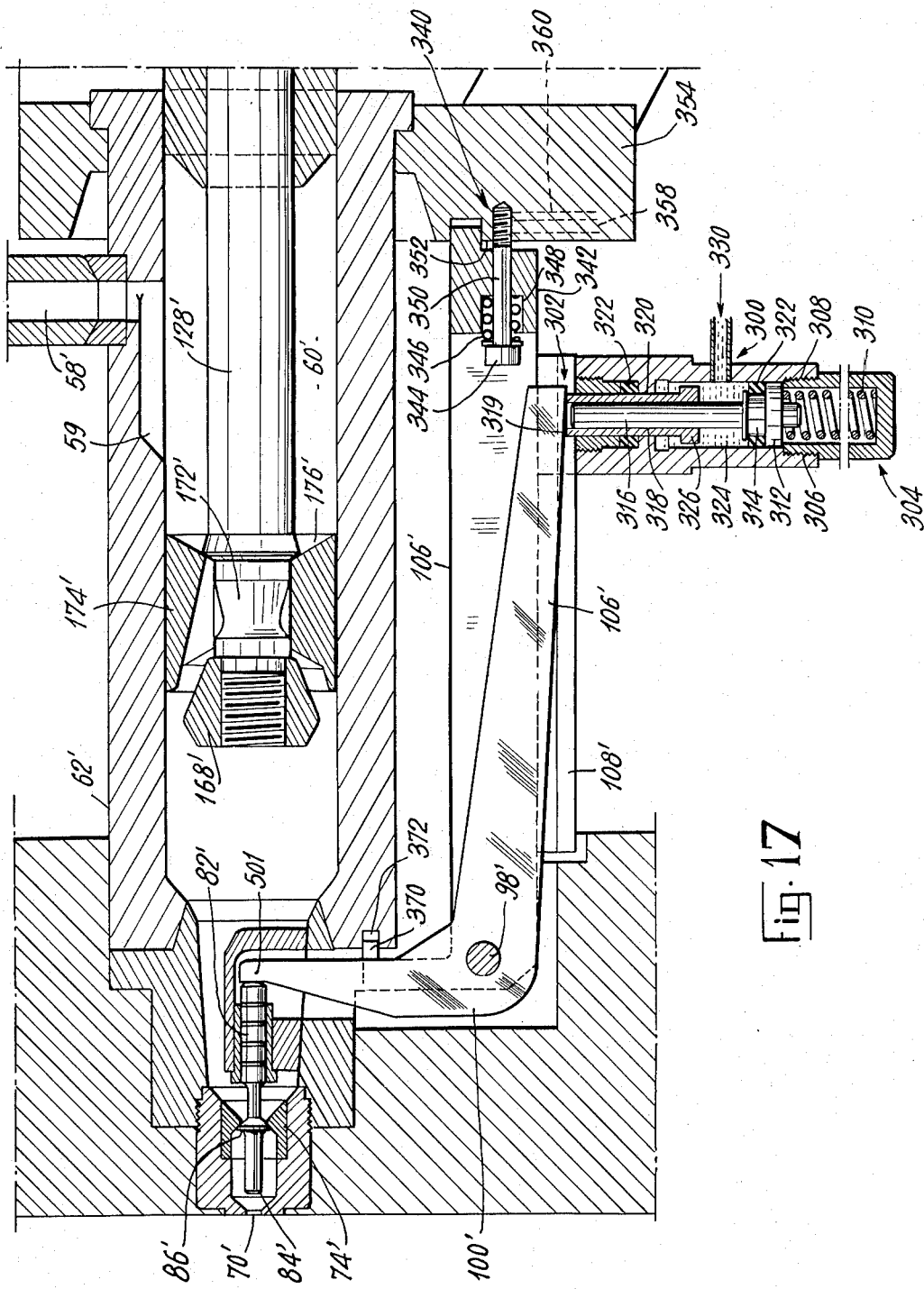

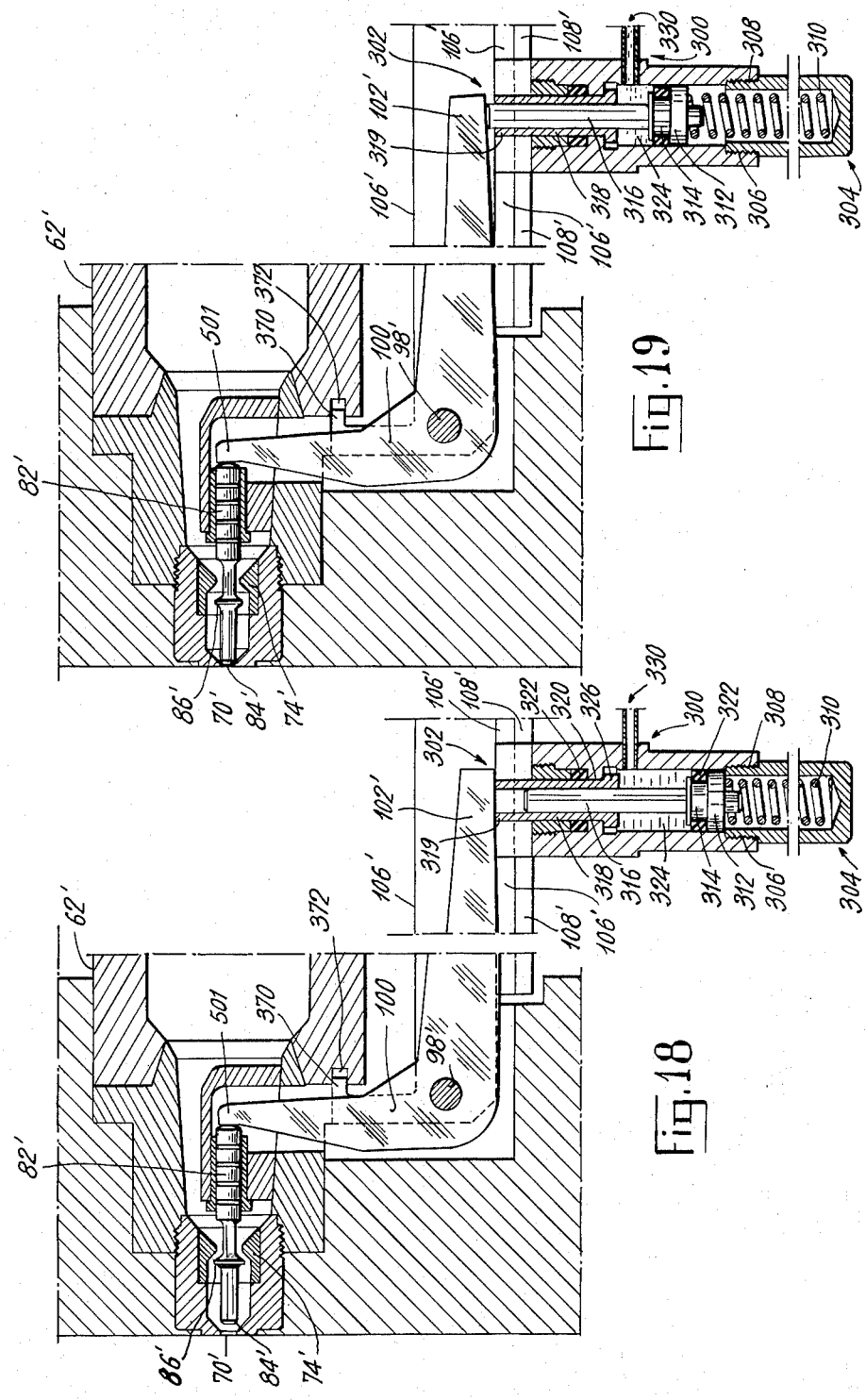

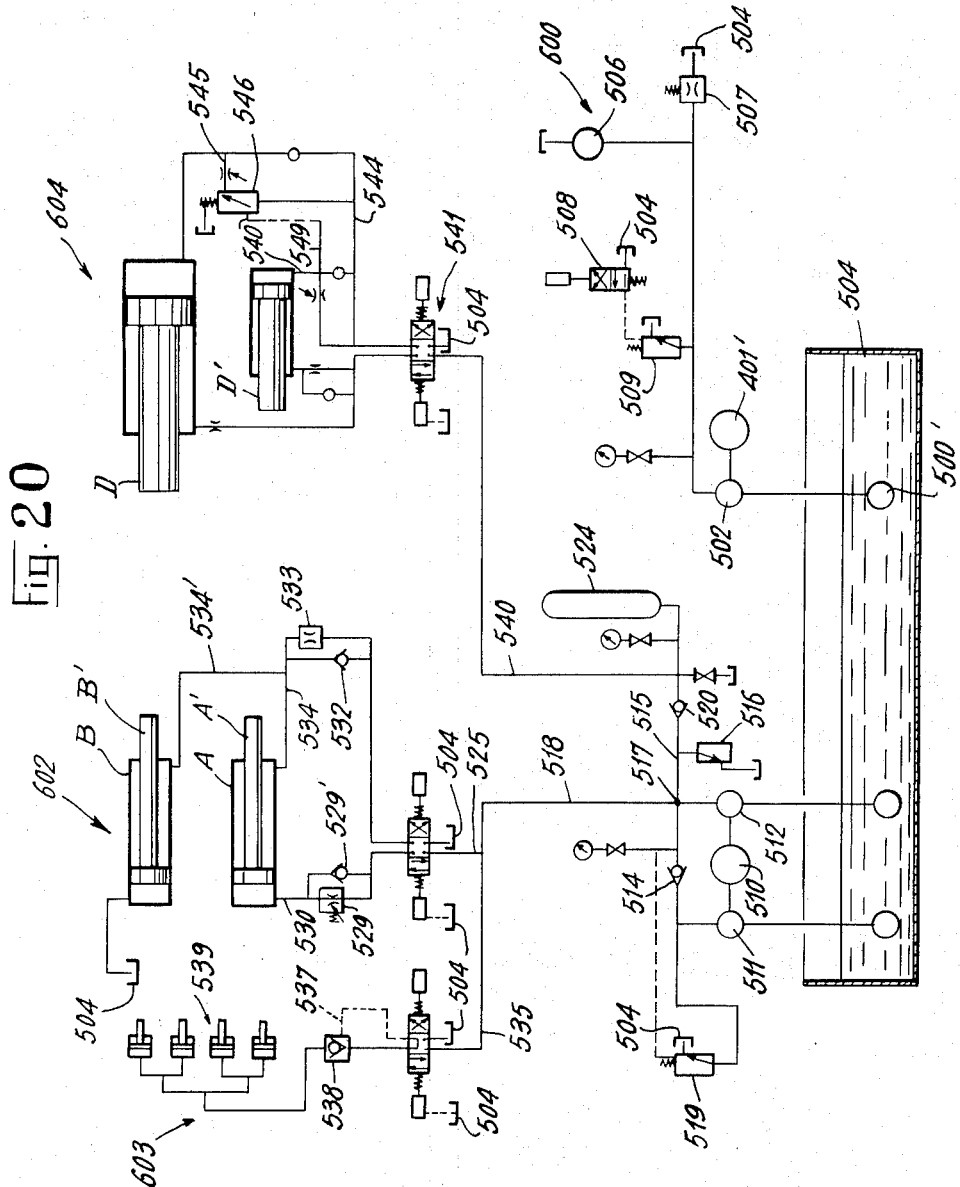

United States Patent Office 3,241,192
Patented Mar. 22, 1966

3,241,192
REGULATING APPARATUS FOR MOLDING
PLASTICS
Robert Nouel, Villejuif, Seine, France, assignor to Inventions Finance Corporation, a corporation of Delaware
Filed June 18, 1963, Ser. No. 289,173
21 Claims. (Cl. 18—30)

The present invention relates to improved regulating apparatus for molding plastics. The invention finds particular utility as applied in the manufacture of large size plastic articles.

The instant application is a continuation-in-part of the following prior applications: Ser. No. 89,254, filed Feb. 14, 1961; Ser. No. 171,878, filed Feb. 2, 1962; Ser. No. 206,507, filed June 29, 1962; Ser. No. 273,144, filed Apr. 15, 1963; and Ser. No. 273,145, filed Apr. 15, 1963.

An apparatus constructed in accordance with the invention comprises basically four sections, namely, a base machine section including supports and base operating components, an injection-transfer mold-feed section, a feed regulation and control section, and a compressive force-applying section which maintains mold parts in compressive engagement during an injection operation.

The compressive force-applying section includes hydraulically actuated force multiplying units which are mounted on the base machine section, and which eliminate the heretofore conventional type piston and cylinder toggle pressing systems. The hydraulically actuated force multiplying units are constructed in accordance with my following prior applications: Ser. No. 173,103, filed Feb. 13, 1962; Ser. No. 187,480, filed Apr. 6, 1962; Ser. No. 206,508, filed June 29, 1962; and Ser. No. 273,241, filed Apr. 15, 1963. The compressive force-applying section of an apparatus constructed in accordance herewith further includes means for adjustably mounting the hydraulically actuated force multiplying units so as to thereby adapt a machine of comparatively small dimensions for handling molds of varying size and shape. Still further, the compressive force-applying section of an apparatus constructed in accordance herewith is so designed as to permit adjustment of the applied thrust and thereby the accommodation of molds of varying characteristics, and the accommodation of injection pressures of varying strengths.

The feed regulation and control section of an apparatus constructed herewith, embodies the principles described with some particularity in my following prior applications: Ser. No. 89,254, filed Feb. 14, 1961, and Ser. No. 171,878, filed Feb. 2, 1962. These principles permit the molding, by rapid injection molding techniques, of articles having large so-called "frontal" molded surfaces. The variations in pressures experienced in forcing material into the mold are used to accurately regulate the performance of the entire molding operation. The regulation is such as to prevent the internal pressure in the mold, resulting from the material fed thereto, from exceeding a predetermined value. Further, the control and regulation is so adjusted as to prevent any overloading and any possibility of separation of mold components which might otherwise result in flash or distortion of the molded articles.

The feed control and regulation section of an apparatus constructed in accordance herewith effectively maintains a prescribed equilibrium force relationship. The relationship is, specifically, one wherein the forces and/or pressures compressing the mold parts into engagement always greatly exceed the distributed injection pressures and forces within the mold tending to separate the mold parts. Such equilibrium or relationship permits the economical production of molded articles having a frontal surface area which greatly exceeds the area of the injection piston—a result which has not been heretofore conveniently or economically obtainable.

The feed regulation and control section incorporates as one important operating assembly thereof, a regulator which serves the dual function of limiting the pressure within the mold to a regulatable and predetermined value irrespective of the final injection pressure, and of closing off transfer between the injection feed means incorporated, and the mold parts.

The injection transfer and mold feed section of an apparatus constructed in accordance herewith is possibly the most significant aspect of the present invention. This section cooperates with the other sections discussed above and incorporates a feed and transfer arrangement which is free of the problems heretofore experienced. More specifically, the injection transfer and mold feed section constructed in accordance with the apparatus embodiments hereof includes a continuously rotating input screw pre-plasticizing assembly. Such assembly is in transfer communication with the injection cylinder or passageway, but still the invention contemplates continuous operation of the pre-plasticizing screw. The ability to obtain this continuous operation permits the molding of articles having large frontal surfaces without facing the difficulties experienced with prior arrangements wherein the screw must be stopped during the injection operation, and/or wherein the sealing problems within the apparatus prevented the use of a continuously operating screw in the fabrication of molded articles having large frontal surfaces.

Consistent with the foregoing, the injection transfer mold feed section of an apparatus constructed in accordance herewith, includes, in addition to the continuously operating pre-plasticizing screw assembly, a transfer chamber and an injection chamber having volumes which are simultaneously varied, and selectively closable means communicating the chambers so as to selectively establish and close material transfer therebetween regardless of the direction in which the volume is being changed in either chamber.

Although the basic aspects of the instant invention have been considered above, there are certain important specific features of the invention. In particular, the basic aspects of the invention can be included in a basic machine or apparatus adapted to operate with a given mold or a limited group of molds. However, the invention finds more widespread use when applied to a machine constructed in accordance with a preferred modification, because with the modification, the machine is readily adapted to accommodate molds of varying characteristics requiring different injection strokes, maintaining forces, and cycles of operation.

Thus, aside from the more general and elementary objects indicated, specific objects of the invention include: (a) the provision of an injection-molding machine conforming with the preceding objects and incorporating means which render the same flexible to easily handle molds of varying size and shape operating under different timing conditions, different pressure conditions, and different feeding conditions; (b) the provision of such a machine which incorporates a movably mounted material feed section adjustable to cooperate with molds of varying size; (c) the provision of such a machine wherein the movable feed section is automatically and sequentially operable and wherein the same incorporates means for pre-adjusting the travel thereof; (d) the provision of such a machine incorporating means which can easily be adjusted to select a predetermined injection stroke within a given relatively wide range; (e) the provision of such a machine which permits adjustment of the injection stroke by limiting the reverse travel of an injection piston means; (f) the provision of such a machine which further incorporates an improved and simplified regulation system affording accurate injection control with the use of but a single plunger-type unit; and (g) the provision of such a machine which incorporates improved connecting means for mounting a mold platen or a mold itself in prescribed relation to force applying, locking or clamping units incorporated in the machine.

The invention will be better understood, and advantages other than those set forth above will become apparent, when consideration is given to the following detailed description. Such description refers to the annexed drawings presenting preferred and illustrative embodiments of the invention. In the drawings:

FIGURE 1 is a side elevational view, partly in vertical section, of a molding machine constructed in accordance herewith and incorporating the feeding system hereof.

FIGURE 2 is a plan view of the machine shown in FIGURE 1 with a portion of the molding machine shown in horizontal section for purposes of clarity.

FIGURE 3 is a vertical sectional view of a portion of the mold feeding system hereof showing the components thereof in the positions they occupy during the state of operation wherein cooling and feeding of plastic material to the injection chamber are performed.

FIGURE 4 is a vertical sectional view, similar to FIGURE 3, but further showing the extrusion screw mechanism of the feeding system and the disposition of components during the stage of operation wherein the mold has just been filled with plastic material from the injection feeding apparatus and the material is flowing from the extrusion cylinder into the injection cylinder thereof.

FIGURE 5 is a sectional view taken on line 5—5 in FIGURE 4 showing certain details of the hydraulic actuator of the feeding apparatus.

FIGURE 6 is an enlarged horizontal sectional view, taken on line 6—6 of FIGURE 7 and presents in detail the regulator unit of the system controlling flow of material from the injection nozzle of the feeding apparatus.

FIGURE 7 is a plan view of the injection nozzle regulator unit taken on line 7—7 of FIGURE 6.

FIGURE 8 is a side elevational view looking to the left in FIGURE 6 and showing further details of the regulator unit.

FIGURE 9 is an enlarged vertical sectional view of the hydraulic control portion of the regulator unit showing the relative position of the components thereof during the injection stage of operation.

FIGURE 10 is a vertical sectional view corresponding to FIGURE 9, but showing the components in the position they occupy when the regulator closes the injection nozzle at the time the mold has been filled.

FIGURE 11 is a vertical sectional view taken on line 11—11 of FIGURE 6.

FIGURE 12 is a side view partially in vertical section of the molding machine hereof equipped with the injection feeding apparatus, and showing schematically the fluid pressure actuating system thereof.

FIGURE 13 is a side elevational view, partly in vertical section, of a preferred modified form of molding machine constructed in accordance herewith and incorporating the various means provided hereby which yield great flexibility in use of the machine.

FIGURE 14 is a side elevational view of the overall machine shown in FIGURE 13.

FIGURE 15 is a sectional side view of the feeding and control systems included in the machine of FIGURE 13.

FIGURE 16 is a schematic flow diagram presenting the preferred hydraulic systems utilized for control of the operation of the machine of FIGURE 13.

FIGURE 17 is a side sectional view of the preferred form of mold feed regulation system incorporated in the machine of FIGURE 13.

FIGURE 18 is a schematic view showing the components of the system of FIGURE 17 in one extreme position.

FIGURE 19 is a schematic view of the system of FIGURE 17 showing the components in another extreme position.

FIGURE 20 is a schematic diagram of the hydraulic system provided for operation of the preferred modified form of machine shown in FIGURES 13–19.

To facilitate an explanation of the invention, as well as to facilitate a complete comprehension thereof, one complete machine is initially described herein below with respect to FIGURES 1 through 12 inclusive. Thereafter, attention is directed to preferred modifications provided in accordance with the invention and included in a machine as shown in FIGURES 13 through 20, the latter machine particularly permits flexibility in use of the invention for molds requiring different operating conditions.

BASIC EMBODIMENT

As illustrated in FIGURES 1, 2 and 12 the injection transfer-mold feed section A of the apparatus of the present invention is applied to the base machine section B and this permits the molding of relatively heavy plastic articles of the order for example of at least three kilograms in weight, as explained more fully below. The molding machine further includes a feed regulation and control section C and a compressive force applying section D. The overall apparatus is actauted and controlled in all its phases of operation by a unitary hydraulic system E.

Referring now in more detail to individual sections of the apparatus hereof, it will be noted from FIGURES 1, 2 and 12 that the machine section B includes generally a support structure 1 having a housing 2 enclosing a mold platen 4, to which one of the mold sections 12 is attached. The platen 4 is positioned at one end of, and in axial alignment with, the operating components of the injection transfer mold feed section A. At the opposite end of the housing 2, there is provided an adjustable support means 10 for adjustably positioning components of a force multiplying and thrust applying mechanism 8. This mechanism comprises a plurality of compact hydraulically actuated units for maintaining the mold sections 12 in compressive engagement under great pressure during injection feeding and various other molding operations. By adjustment of the support structure 10, the force applying mechanism 8 can be adjustably positioned in order to enable the use of mold sections of different sizes for different size and shape articles. The support structure 10 for the force applying mechanism 8 also has mounted thereon, axially of the mold sections 12, a hydraulic cylinder 14 having a piston housed therein. The piston has a rod 16 extending therefrom and connected to the nearest axially aligned mold section 12 to effect its opening and closing movements relative to the other mold section adjacent the transfer-feed section A. A tubular thrust member 18 is disposed concentrically of the rod 16 and secured to the same mold section to which rod 16 is secured. Thrust member 18 is adapted to be engaged by the jaw means of the force applying mechanism 8 when locked thereby during the injection feeding operation.

The hydraulic system for actuating the machine section B and the transfer feed section A briefly described above, includes a hydraulic pump 20, driven by a motor 22, which charges an accumulator 24. The accumulator supplies hydraulic fluid under pressure to the cylinder 14 by way of the distributor valves 26 and 28 and the conduits 30 and 32. A conduit 37, including branch conduits 33 and 35, also extends from the accumulator 24 to supply fluid under pressure to actuate the mold force applying mechanism 8 and further to operate hydraulic jack 34 which as explained below, serves to adjustably position components of the transfer-feed section A relative to the mold under the control of valves 36 and 38 respectively. Another conduit 40, including branch conduits 42, 44 and 46, extends from the accumulator 24 under control of valve 48 to the injection mechanism A to supply pressure fluid to actuate certain feeding components as well as the jack 34, all in a manner to be later described.

With particular reference to FIGURES 1, 2 and 12, it will be noted that transfer-feed section A comprises an extrusion cylinder 52 on which is mounted a hopper 50 for receiving the primary molding material in the solid state. The hopper communicates with the interior of the cylinder 52 by means of a molding material flow passage 54 entering the cylinder at the right end thereof. The cylinder 52, may be heated externally by any suitable means. It is mounted on a raised frame structure 138 carried by support mean 1 and is secured thereon by any suitable means. At its left end the extrusion cylinder 52 communicates through duct or passage 58 with a cylindrical transfer chamber 60 interiorly of an injection vessel or structure 62. The vessel 62 is supported by a suitable connection in a vertical wall portion of the support frame 138. An extrusion screw or worm 64 is rotatably mounted axially in cylinder 52, and is of such size as to conform substantially with the interior dimensions of the cylinder to thereby form a molding material extrusion feeding device. A suitable motor assembly 66 at the right end of the cylinder 52, as shown, rotatably drives the worm 64. Slide means suitably secured to the molding machine, such as members H, H, are adapted to slidably support and maintain the injection feeding apparatus in proper position and alignment with respect to the mold structure of the machine section B. The entire section A is slidably positioned on section B, and moveable under the control of hydraulic jack 34.

INJECTION REGULATOR CONTROL

Bolted or otherwise secured to the end of the injection vessel 62, and disposed adjacent the mold structure of the machine, is an injection nozzle regulator or control unit K. This unit includes an injection nozzle 68 which has an injection orifice 70 axially of its end facing towards the mold structure C. The nozzle 68 is axially and threadedly secured in an elongated nozzle housing 72 sealingly closing the end of the injection vessel 62. Mounted in the nozzle 68 intermediate its length is a member 74 forming a valve seat and having a valve orifice 76 in axial alignment with the injection orifice 70. The member 74 divides the nozzle 68 into small nozzle chambers 78 and 80 to the right and left thereof, respectively, as shown in the drawings.

A slide valve 82, slidably supported in nozzle housing 72 in alignment with orifices 70 and 76, has an enlargement 84 on its end adjacent orifice 70, which enlargement is adapted to close the orifice 70 when slid therein. Spaced from the enlargement 84, a second enlargement 86 is provided on valve 82. The enlargement 86, when moved into valve orifice 76, closes this orifice. A passage or injection channel 88 extends longitudinally of the nozzle housing 72 and connects nozzle chamber 78 with the interior of the adjacent injection cylinder vessel 62.

The regulator portion of the injection nozzle regulator control structure K, noting particularly FIGURE 6, comprises an L-shaped support frame 94 including an arm extending laterally from the nozzle housing 72 and another arm 106 that projects parallel with and beneath the injection vessel 62. At the junction of the two arms of the L-shaped frame 94, a bellcrank lever 96 is pivotally mounted on a pin 98 disposed a fixed distance X from the axis of the valve 82. The vertical arm portion 100 of the lever bears against the end of the slidable valve 82 remote from its end portion 84. The other arm 102 of the bellcrank extends generally horizontally within and along a vertical slot 104 of the angular lower arm 106 of the L-shaped frame 94.

Within a slideway 108 provided in the vertical slot of the lower arm 106 of the frame, is slidably and adjustably positioned an injection regulator device 110. This device has two parallel disposed pistons 112 and 114 projectable toward, and adapted to engage, arm 102 of the bellcrank to provide a thrust thereagainst under conditions to be later described. The piston 112 nearer to pin 98, is by reason of the adjustability of the device 110 along slideway 108, disposed an adjustable distance Y from pin 98 and comprises an injection regulating piston. The second piston 114 comprises a positioning piston for the valve 82. Piston 114 has a lower portion of enlarged diameter forming an inner piston 116 slidable in the cylinder 118 which communicates at its upper end with a hydraulic chamber extending below piston 112 by means of a cross passage 120 into which an external conduit 122 opens for conducting hydraulic operating fluid from the external source into the device. The positioning piston 114 is normally urged in a direction outwardly of the device towards and into engagement the lever arm 102, by means of a coiled spring 124 when there is an absence of hydraulic pressure in the cylinders.

Opposing the force on the valve exerted by the fluidized plastic material in chamber 80, is the force exerted on the right hand end of the valve means by the lever 100. This force is created by the regulating means operating against the arm 102 of lever 96.

Piston 112 when actuated by hydraulic pressure in the cylinder beneath it, engages lever 102 at a point a distance Y from the pivot 98. The distance Y is adjusted so that the force exerted by the lever 100, as the result of the hydraulic pressure in the cylinder, just balances the force on the end of the valve means due to the fluidized plastic material. At the same time, hydraulic pressure acting in the cylinder 118 forces the piston 116 downwardly against the spring 124 to compress the spring 124 and disengage piston 114 from the lever 102.

In the operation of the injection apparatus, pressures in the chamber 80 vary with types of pieces being molded and with their sizes and their shapes. As a consequence, it is essential for the proper operation of the apparatus to provide for different operating pressures in the chamber 80 by providing a means to adjust the balancing force. Heretofore, this was accomplished by the varying of the pressures acting in the cylinder beneath a piston comparable to the piston 112.

In the present structure, the hydraulic pressure is not varied to obtain the new opposing force. Instead, the regulation means is adjusted relative to the arm 102 by sliding motion in the guiding and supporting means 108 to a new position where the Y distance relative to the X distance between the pivot 98 and the end of the lever 100 provides the proper compensating force on the end of the valve means. The regulating means is adjusted to the proper distance Y to obtain the proper force on the right hand end of the valve to oppose the force exerted by the plastic fluid on the left hand end of the valve means during the injection phase of operating cycle of the transfer piston. Once so adjusted, it remains fixed for use until the apparatus is set up for a molding of a different piece requiring different pressures.

Piston 112 operates on the lever 102 when hydraulic pressure is exerted in the regalating means to maintain the valves 84 and 86 spaced from their respective seats, that is, during the injection phase of operation of the apparatus. As the mold becomes filled with fluidized plastic material, the back pressure resisting the flow of fluidized plastic builds up and this pressure is transferred to chamber 80. It acts on the valve means to force the valve 86 against its seat to close orifice 76 and stop the flow of fluidized plastic material into chamber 80. This action of the valve comes about by reason of the increased pressure in chamber 80 producing a force on the valve exceeding the force exerted on the valve by the regulating means.

At about the same time as the valve 86 becomes seated, the pressure on the right side of the valve 86 is reduced. Also, the hydraulic pressure in the cylinder beneath the piston 112 is released and the pressure exerted thereby is relaxed and the piston 114 simultaneously engages the lever 102 at a distance greater than distance Y to force the valve means towards the left where the valve 84 engages its seat about orifice 70 to close the same against further injection. The valve remains in this position until it is desired to repeat the cycle of operations.

When a new mold is presented at the injection station and the injection apparatus has been moved into engagement with the mold by the jack means 34, pressure is applied to the fluidized plastic in the cylinder 62 and the hydraulic pressure is again established in the regulating means beneath the piston 112 and above the piston 114. The pressure from the plastic acting on the left side of the valve 86 forces it towards the right to open the valve 84. Thereafter the regulating force exerted on the lever 100 by piston 112 comes into play and the cycle of operations are repeated as above stated.

INJECTION-TRANSFER-CHAMBER

In the end portion of the transfer chamber 60 of the injection cylinder vessel 62 remote from the injection nozzle 68 is slidably mounted a relatively long cylindrical scavenging piston 126 which forms an adjustable closure for the adjacent end of the transfer chamber. Piston rod 128 extends axially through the scavenging piston 126 for free sliding movement therein. Piston 126, on the extreme end thereof extending exteriorly of chamber 60, is formed with a stop flange 130 to limit movement of the piston into the chamber 60. The end of slidable piston rod 128 extending outwardly through scavenging piston 126 has an abutment which is adapted to be engaged by an abutment plate 132. Abutment plate 132 is mounted on the adjacent end face of an axially aligned hydraulic injection piston member 134, slidably mounted in a hydraulic power cylinder 136, fixedly mounted on frame support 138. The piston member 134 is enlarged at 140 to form fluid pressure chambers 144 and 150 on opposite sides thereof in the cylinder 136. Suitable packing is provided on the piston portion 140 and the cylinder 136 for effective sealing purposes. An opening 146 in the outer end 148 of cylinder 136 provides a fluid flow connection to chamber 150 from a branch conduit 152 which also has flow connection with the conduit 122 opening into the regulator unit 110. A connection 154 for pressure fluid flow to chamber 144 of hydraulic power cylinder 136 extends through the support structure of cylinder 136 and has connection to another portion of the fluid pressure system. A more detailed and complete description of the hydraulic control system is included in my copending application Serial No. 273,145 to which reference may be made.

Extending longitudinally of injection piston 134 in the hydraulic cylinder 136 in equally spaced relation to each other are a plurality freely slidable abutment rods or auxiliary pistons 156 which at one end bear at all times against the outer end face of scavenging piston 126 while the opposite ends extend into pressure chamber 150 of hydraulic cylinder 136.

The stop flange 130 of the scavenging piston 126 has fixed thereto a lug or dog 158 while the adajacent end of piston rod 128 likewise carries a dog 160, each of the dogs 158 and 160 being adapted to engage, under certain conditions of operation to be described, with electrical contacts 162 and 164 respectively of an operating electrical control circuit (not shown) for the apparatus, the contacts 162 and 164 being opened and closed respectively by the respective dogs 158 and 160.

Piston rod 128 within the cylindrical transfer chamber 60 has formed thereon a combined abutment and valve flange 166 spaced from its end which end has a diameter enlarged relative to that of the rod and threaded to receive a nut 168 thereon. Intermediate the nut 168 and the abutment-valve flange 166 a section of 172 of the piston rod 128 carries a piston member 174 freely slidable thereon with slight clearance and limited in its sliding movement by the nut and abutment-valve flange. The end faces of piston member 174 are of hollow conical shape forming bearing surfaces 176 and 178, the bearing surface 176 being engaged by a complementary shaped portion of the abutment-valve flange 166 on the piston rod 128 in one direction of rod movement while the other bearing surface 178 engages a complementary-shaped surface on nut 168 during the opposite direction of rod movement. A plurality of equally circular spaced longitudinally tapered passages 180 are provided in the piston 174 extending between the bearing surfaces 176 and 178, the large ends of the passages 180 terminating in surface 178 and opening radially outwardly of the periphery of nut 168 so as to be open at all times, and even when the piston bearing surface 178 is in contact with the nut. The small ends of passage 180 terminate in the piston bearing surface 176 and are completely closed by the rod abutment-valve flange 166 when the flange 166 is in engagement with the bearing surface 176 but are open and free of the abutment-valve flange 166 when nut 168 is in engagement with the bearing surface 178 thereby providing passages for relatively free flow of plastic material through the piston under conditions herein disclosed.

In the periphery of the scavenging piston 126 is an elongated channel or groove 182 opening to the end face of the piston in transfer chamber 60. A similar registering groove 184 is formed in the interior surface of the wall of vessel 62 forming the cylindrical wall of the transfer chamber 60.

OPERATION OF THE INJECTION TRANSFER SYSTEM

The molding machine and injection feeding apparatus herein disclosed functions as follows:

Assume that fluid under pressure from the hydraulic system has initially closed and clamped the mold sections 12 as by operation of hydraulic jack 14 and the forces appplying means 8. Also assume that by operation of the hydraulic motor or jack 34, the entire feeding assembly A slides on rods H, H into feeding position adjacent the feeding or plastic admission port of the mold platen 4 where it is maintained and the injection piston 134 is positioned as shown in FIGURE 3.

The primary plastic material, which has been placed or poured in the hopper 50, flows into the extrusion cylinder 52 by way of the cylinder inlet passage 54 and it is then advanced progressively therethrough towards the outlet duct 58 by rotation of the worm 64. This results in forcing the material into transfer chamber 60 as indicated in FIGURE 3, through the now open tapered piston passages 180 into, and filling the injection chamber 61. As the plastic molding material is moved along in extrusion cylinder 52 by worm 64, it progressively changes from the solid state to a liquid plasticized state by reason of the external heating means therefor (not shown).

Fluid under pressure, such as hydraulic fluid, having been admitted to pressure chamber 150 of cylinder 136 causes the end 132 of injection piston 134 to thrust against the end of piston rod 128 which is forced to move toward the injection channel 88. As the piston rod 128 is moved by hydraulic injection piston 134 the abutment-valve flange 166 of the piston rod 128 thrusts against bearing surface 176 of piston 174 closing the ends of the tapered piston passages 180. As the now-in-effect solid piston 174 moves to the left in FIGURE 4 under the action of piston rod 128, it forces the plasticized material contained in the injection chamber 61 through injection channel 88, thence through the orifice 70 of the injection nozzle 68, which in the meantime has been opened by plastic fluid pressure, and thence towards the mold of the molding machine. It is, of course, to be understood for this operation that the nozzle 68 at this time is held tightly against the admission port of the mold, as indicated in FIGURE 12, to prevent escape of the plasticized material.

For opening the valve 84 and port 70, the pressure now acting on the hydraulic fluid in compression chamber 150 (and simultaneously released from chamber 144) of cylinder 136 is transmitted to the regulator unit 110 via conduit 122 (FIGURE 12) and thrusts against the lower enlarged end 116 of the positioning piston 114 to thereby withdraw the piston 114 within the casing of the nozzle valve regulator 110 against the outward thrust of its spring 118. At the same time the pressure thrusts the regulating piston 112 outwardly of the regulator casing 110 until stopped by the enlarged end 113 of the piston (FIGURE 9). The regulator piston 112 now operates on the valve 82, via bellcrank lever 96, in the position shown in FIGURE 3, and the fluidized plastic in chamber 60 operates to open the flow orifice 76 of valve member 84, thereby permitting the flow of the plasticized material therethrough and out through the injection nozzle orifice 70 into the mold plastic admission port under the thrust of piston members 128, 174 by the hydraulic pressure acting in pressure chamber 150 of the hydraulic cylinder 136.

As the mold becomes full of the plasticized material, the injection pressure in the nozzle chamber 80 increases until it equals the injection pressure in the injection nozzle chamber 78 and injection channel 88. Due to the differential in the end area of the end portion of slide valve 82 acted on by the pressurized material in nozzle chamber 80 with respect to the lack of a countering effective area of the slide valve 82 in nozzle chamber 78, the valve force to move backwardly against the force exerted by the regulator piston 112 acting on bellcrank lever 96 until its enlarged valve section 86 closes the valve orifice 76 of the nozzle valve component 74 thereby preventing further flow of the plasticized material, as shown in FIGURE 4. At this stage, the dog 160 on the end of piston rod 128 actuates switch 162 to cause a reversal of flow, as regards hydraulic chambers 144 and 150 of the hydraulic injection cylinder 136, chamber 144 now becoming the pressure chamber by the admission of pressure fluid thereto through port 154 to move piston toward the hydraulic cylinder end 148 in FIGURE 4, the chamber 150 now exhausting to the low pressure section of the hydraulic system.

With the release of hydraulic pressure from compression chamber 150, and hydraulic pressure in the nozzle valve regulator 110 by reason of its connection 122 to chamber 150 likewise becomes released. This drop in pressure (to atmospheric) negates the effect of regulator piston 112 against arm 102 of bellcrank 96 and permits the spring 124 of the nozzle valve regulator to simultaneously thrust the positioning piston 114 into contact with arm 102 to cause arm 100 of the bellcrank to move portion 84 of slide valve 82 into the nozzle orifice to close it against the escape of plasticized material therefrom. The hydraulic jack 34 is now actuated to slide the injection feeding apparatus on its slides H, H away from the admission port of the mold platen 4 until such time that the injection feeding procedure is to be repeated.

During the entire time that the plasticized material was being forced out of the orifice 70 of the injection nozzle 68 by the movement and thrust of the piston member 174 by piston rod 128, the worm 64 was continuously rotating and forcing the plasticized material into the transfer chamber 60 through passages 58 and 184. Even though the scavenging piston 126 was being moved by rods 156, at the same time as piston 174 was moved since the areas of their opposite ends were exposed to the fluid pressure in the chamber 150 of the hydraulic injection cylinder 136, the plasticized material was enabled to flow into the cylindrical transfer chamber 60 of the injection vessel 62. The flow was provided for by the co-action of flow channels 182 and 184 in the scavenging piston and chamber wall, respectively, since these channels are of such a length as to provide for its admission at all time, and since the scavenging piston 126 was prevented from closing them by reason of its stop flange 130.

During the simultaneous movement of the pistons 174 and 126 towards the left as viewed in FIGURE 3, it must be remembered that the rate of movement of the piston 174 may be greater than the volume of material displaced by the worm. As a consequence, the space between the pistons 174 and 126 accommodates itself to the rate of travel of the piston 174 and the displacement of the worm 64 by the action of the piston 126. In other words, the space between the pistons 174 and 126 enlarges with the plastic material forced therebetween by the worm during the forward stroke of the injection piston 174.

At the end of the leftward stroke of the piston 174 under the action of piston 134, the abutment 160 engages the switch means that energizes the circuit to reverse the valve 48. This causes the admission of fluid pressure to the chamber 144 and the release of pressure in the chamber 150 and the regulator 110. This results in the withdrawal of the piston 134 from abutment relation with the rod 128. As a further consequence, the rod 128 is moved by the trapped fluid pressure acting on its left end to move it relative to the piston 174 to open passage 180 and establish communication between the chambers 61 and 60.

Continued operation of the worm 64 feeding the plastic into the chamber 60 now results in the flow of the plastic into chamber 61 from chamber 60 causing it to continue to act to drive the piston 174 and the rod 128 towards the right to the limit of its motion in that direction where the rod again engages the end of the piston 134. The motion of the piston takes place at the rate determined by the rate of flow of the plastic material through the valved orifice in the piston 174. The piston 126 moved to the right at a greater rate than the piston 134 and reaches the end of its rightward motion before the piston 174. When piston 126 reaches the end of its stroke toward the right the abutment 158 engages the switch to close contacts 159. When the piston 174 reaches the end of its stroke, it closes contacts 164. The switches 159 and 164 are in series in a circuit that causes the reversal of the valve 48 to repeat the work cycle of the injection means, unless for reason the apparatus is set for one cycle operation.

For repetitious operation, the injection piston 174 would dwell in its righthand position only so long as it is required to remove the molded piece and reclose the mold and lock it in place, which with the present structure requires a very short time in the range of a few seconds. The timing of the apparatus is such that the operation of the emptying of the mold can be and is performed during the rightward motion of the pistons 174 and 126, so that at the end of the rightward travel the new empty mold is in place clamped and the injection apparatus moved into position for the repetition of the work cycle of the apparatus.

PREFERRED BASIC MODIFIED ARRANGEMENT

The preferred form of modified machine provided hereby and adapted to permit wide flexibility in use is presented generally in FIGURES 13 and 14, and details of such machine are shown in FIGURES 15 through 20, inclusive. By referring initially to FIGURE 13, it will be noted that such machine incorporates certain basic means or systems corresponding to those used in the embodiment of FIGURES 1–12. Prime numerals are used to designate the corresponding sections of the respective machines, and thus the injection transfer—mold feed section of the machine of FIGURE 13 is designated as A', the base machine section as B', the feed regulation and control section as C', the compressive force applying section as D', and the nozzle regulator or control unit as F. By comparing FIGURE 1 with FIGURE 13, it will be noted that certain individual components or members are virtually identical and accordingly are similarly designated by prime numerals in FIGURE 13.

Thus, the worm or screw 64' in FIGURE 13 is carried within the worm or screw housing 52' such that the worm serves to pre-plasticize the material which is fed from the preplasticizer through the outlet passageway 58'. Similarly, the material is fed into the pre-plasticizing housing 52' through the hopper 50'.

To avoid duplication in description, prime numerals have also been used in other instances in FIGURES 13 through 20 so as to identify individual components which correspond with such components already described in relation to FIGURES 1 through 12. The basic components included in the respective embodiments, and the general operation of the respective embodiments is identical, and in the following description attention will be directed to the improvements shown in FIGURES 13 through 20 inclusive.

FEEDING ASSEMBLY

In the embodiment of FIGURES 1 through 12, the entire feeding assembly A slides on the rods H—H into feeding position through the action of the hydraulic jack 34. A similar operation is achieved in the embodiment of FIGURE 13, although through a slightly different arrangement. By referring to FIGURE 13, it will be noted that a bearing support mount 206 is supported in fixed relation to the machine frame 1' by means of a support structure including the rod member 212. Actually, as shown in FIGURE 15, the bearing support mount 206 comprises a ring which is disposed in axial alignment with the injection piston and the injection orifice. The rod 212 is but one of two rods, preferably, fixing the bearing support mount 206 in a given position. Cooperating with the support mount 206 is a bearing member 208 which has a threaded internal bore receiving the threaded end 210 of a piston rod 204 extending from a piston 202. The piston 202 is disposed in a piston housing or chamber 200. The piston chamber 200 is fed by a line 214 and through a passageway 216 in a mounting block 218. The mounting block 218 serves as a support for virtually the entire injection transfer—mold feed section.

The other components of such section are described more fully below, but for purposes of the description at this point, the other components can be generally designated as those carried on and supported by the slide structure 220. This structure, as shown in FIGURE 13, has a dove-tail shape base 222 which is in slidable engagement with a slideway 224 of corresponding configuration, but carried in the upper surface to the support structure 1 for the overall machine. As a result of this overall construction, when fluid under pressure is introduced into the line 214 and travels through the passageway 216 entering the left end of the chamber 200, such fluid exerts pressure against the piston 202. The piston 202, however, is fixed in position by virtue of its direct coupling with the bearing support mount 206. Thus, only the housing 200 and its associated parts are free to move in response to the fluid pressure. Accordingly, once the fluid under pressure is initially introduced within the chamber 200, the entire assembly associated with the slide 220 moves to the left until it assumes the position shown in FIGURE 15. Quite naturally, at the start of the operation, the piston 202 would be disposed at the left end of the housing shown in FIGURE 15, as opposed to in the position which it assumes in such figure as presented.

The provision of the bearing support mount and cooperating bearing member 208 with the threaded interior, in combination with the threaded end 210 on the piston rod 204, permits an operator to selectively adjust the maximum movement of the slide 220 and its associated components. For certain operations, the travel of the slide will be extensive, whereas for others it may be comparatively short. In any instance, however, a presetting can be comparatively easily achieved. Rotation of the rod 204 through the handle 205 will affect the initial adjustment, and the same will be maintained through a locking action achieved when the handles 207 are rotated to cause a compressive action of the member 208 against rod 204 in accordance with a conventional locking practice.

The slide mounting referred to above eliminates the need for the rods H—H of the embodiment of FIGURES 1 through 12, and permits an easy movement of the injection transfer and feed section as a unit to accommodate molds of varying size, shape, or other characteristics.

ADJUSTABLE PLATEN COUPLING

In the embodiment of FIGURES 1 through 12, it was assumed that the platen 81 which is adjustable, and which most directly cooperates with the thrust-applying mechanism 8, was suitably attached to its support 18 by any means desired. Where changes in platen are to be made, and where differentiating movement is required, it is desirable to have some selectively adjustable coupling between the movable platen and support therefor. Accordingly, in the embodiment of FIGURE 13, an adjustable coupling 240 is provided between the support 18' and the platen 81'. This coupling comprises a series of interlocked components which can be assembled as shown so as to couple the platen 81' to the support 18' without in any way disturbing the force-applying and thrusting mechanism 8. The adjustable coupling includes a base collar 235 cooperating with an extended sleeve 237 having an enlarged flange portion adjacent the platen 81'. Disposed peripherally about the sleeve 237 are a pair of interlocked sleeves 230 and 232, the interior of the latter-mentioned sleeves having threads thereon cooperating with the exterior threads on the sleeve 237. A sleeve 228 slips over the sleeves 230 and 232 and is provided with a base flange that underlies an inwardly extending flange carried at the top of the fixing collar 226. Threaded coupling is provided between (a) the interior of such collar and (b) the exterior of the flange carried at the base of the sleeve 228 and the flange which surrounds the periphery of the ring 234. Either the ring 234 or the collar 226 can be directly attached to the platen 81' through screws 233 and if desired, an aligning collar 239 can be incorporated to readily permit alignment between the sleeve 237 and the platen 81'.

With the provision of the coupling assembly 240, the force thrusting mechanism 8' can be vertically positioned, as shown, and need not be moved for purposes of coupling various platens with the support or thrusting member 18'.

SCAVENGING PISTON ADJUSTMENT

In the basic embodiment of the figures initially discussed in the instant specification, control of movement of the scavenging piston 126 was achieved only through the use of switches. The switches were not readily adapted for adjustment of the injection volume to accommodate molds which would require different injection strokes. Such limitation, however, is not experienced with the modification hereof. If reference is now made to FIGURE 15, it will be noted that the scavenging piston 126' is shown as cooperating with the piston rod 128' and with the valve injection piston in basically the same manner as indicated previously. However, in place of switch control, a hydraulic adjustment system with a selectively adjustable arm coupling therein is incorporated.

More specifically, in surrounding relation to the rear end of the transfer chamber 60' or the housing 62' forming the same, there is provided a ring support 250. Such support carries a coupling arm 252 extending downwardly from the base thereof. The arm 252 carries a pivot pin 254 on which is mounted the lower end of a stop arm 256, the stop arm 256 being pivotal about the pin 254 as a result of the mounting. As should be apparent, if the stop arm 256 is fixed in the position shown in solid line in FIGURE 15, then the scavenging piston 126' can move rearwardly only to such position. Conversely, if the scavenging piston 126' is moved forwardly, the arm 256 can move forwardly therewith, but upon return movement, the arm 256 would limit the movement of the scavenging piston. Of course, if the stop arm 256 is adjusted so that it can pivot further rearwardly than the position shown, then the scavenging piston can move rearwardly by a greater distance than in the prior case, and in turn, the injection volume will be increased.

To achieve the adjustment of the arm 256, a threaded coupling 258 is incorporated. This coupling is mounted by a pivot pin 259 on the arm 256 which is suitably bored or bifurcated to accommodate the end of the coupling 258 on the pivot mount provided by the pivot pin 259.

The interior of the coupling member 258 is threaded to receive the threaded end 262 of a coupling shaft 266. A locking nut 264 is carried on the threaded end 262 to serve as a stop and lock for threadable adjustment of the shaft 266 in the coupling 258. Furthermore, a suitable locking nut and bolt 260 is provided to essentially provide a clamp about the threaded end 262 to maintain the same fixed in a given position.

The end of the shaft 266 opposite the threaded end 262 thereof comprises a ball joint 268 which is secured in position by a collar 269 to yield a universal joint 265. The universal joint is coupled, through the collar 269, with the piston 270 which is reciprocal in the piston housing 272.

By virtue of the above arrangement, the movement of the arm 256 comes to its stop or end position when the piston 270 is moved entirely within the housing 272. If it is desired to have the arm 256 come to its stopped position in advance of the position shown in FIGURE 15, then the shaft 266 is rotated such that it does not extend as far within the coupling member 258. In other words, the effective length of the shaft 266 is lengthened. Thus, in traveling to the right, the arm 256 would be stopped in advance of the position in which it is presented in solid lines. The adjustment can be made, for example, between the solid line position shown for the arm 256 and the dotted line position shown for the arm 256 quite easily.

The arrangement just described serves as a means for limiting the injection volume, or selectively adjusting the same. In specific detail, it serves as a means for limiting the movement of the scavenging piston 126'. It should be here noted that the upper end of the arm 256 is bifurcated as at 255 so as to accommodate the piston rods 128' without interfering with the operation thereof.

Before referring to other modifications, it is important to understand that the adjustment is made at the end of the return stroke of the scavenging piston. If this adjustment was set at the end of the advancing stroke of such piston, then problems may be encountered in material uniformity. More specifically, during the advancing stroke, as shown by the dotted line position of the scavenging piston, the scavenging piston moves into substantial blocking relation to the material infeed passageway 59 from the pre-plasticizing means. If the piston remained in this position for any substantial period of time, there would be some stagnation of plastic in front of the scavenging piston, and this may result in lack of uniformity. However, with the limitation of movement on the scavenging piston being utilized at the end of its return stroke, there is no delay in movement of the scavenging piston during any time when it is in blocking relation to the passageway 59.

MOLD INFEED REGULATION

Regulation of the mold infeed cutoff has been described above with particular reference to FIGURES 3, 5, 6, 9 and 10. It will be remembered that the regulation referred to initially was achieved through use of the bell crank arm 100 moving about the pivot pin 98 and through the cooperation therewith of the respective pistons 112 and 114 mounted in a slidable regulator control unit 110. The regulation consistent with the preferred modification achieves generally the same operation as that discussed above, but through a substantially simpler structure.

If reference is now made to FIGURE 17, it will be noted that the bell crank arm thereshown is designated by the numeral 100'. It is mounted in an auxiliary support 106' which is L-shaped and which has an adjustable slideway 108' in the lower base portion thereof. The bell crank arm 100' is pivotal about the pivot pin 98'. The regulating valve assembly itself corresponds with that described previously. During the normal infeed, the enlargement 86' on the valve piston 82' does not block the passageway in the seat member 74' and material can be fed through said valve as shown in FIG. 18. However, when the mold fills, and the back pressure of material in the mold is exerted on the valve piston, then the enlargement 86' closes the orifice in the seat member 74' thus resulting in rearward movement of the piston head 82', and the bearing thereof on the upward extremity 501 of the bell crank arm 100'. This same basic operation results whether the basic embodiment described initially or the modified embodiment of the invention is used. The variation in structure with which we are here concerned relates to the auxiliary control of movement of the bell crank arm 100', and specifically for forces exerted on the portions 102' thereof.

As shown in FIGURE 17, an auxiliary housing 300 provided with an upper slide mounting 302 serves to adjustably mount the control for the bell crank arm 100'. The housing 300 cooperates at its lower end with another housing 304 which has an upper end 306 threadably engaged with interior threads carried on the open end 308 of the housing 300. The auxiliary housing 304 carries a coil spring 310 therein which bears against the head 312 of a piston generally designated by numeral 314 and carried within the housing 300. The piston 314 includes the piston rod 316 which extends centrally through an auxiliary piston 318 which is hollow or centrally bored as at 320. A suitable seal 322 is provided so that the piston rod 316 is in fluid-sealed but slidable relation within the hollow piston 318. The piston head 312, and the lower portion of the piston 318 are reciprocal within the chamber 324. However, the lower portion or head 326 of the piston 318 has a diameter less than the diameter of the chamber 324, whereas the head 312 has a diameter which closely corresponds to the diameter of the chamber 324.

In normal feeding operation, as shown in FIGURE 18, the piston 318 is at the upper extremity of its path of movement and the piston 314 is at the lower extremity of its path of movement. In FIGURE 19 at the end of feeding operation, the reverse positions are shown, the piston 314 is at the upper extremity of its path of movement.

Now, consider again the operation of the regulating valve itself. As the mold cavity fills, a back pressure is exerted on the enlargement 86' of the valve piston forcing the piston to the right, so to bear against bell crank arm 100' causing bell crank arm to rotate clockwise about pivot pin 98'. This rotation exerts a downward force on the upper end of the piston 318 so that the same can move downwardly. As explained more fully below, at approximately this time, the pressure applied to pistons 318 and 314 is released and the compression spring 310 then expands forcing piston head 312 and correspondingly the piston rod 316 upwardly to move the bell crank arm counter-clockwise and force the end 84' of the regulating piston into the outlet orifice 70' of the valve (FIG. 19). In the normal operation, when the injection feeding is started, fluid under pressure is fed within the chamber 324 through the inlet 330. This fluid forces the piston head 312 downwardly so that the same abuts against the upper end of the auxiliary housing 304. Simultaneously, the piston 318 is forced upwardly so that its upper end 319 is disposed in a position where it maintains the bell crank 100' in the desired position to locate the enlargement 86' of the valve piston out of closing relation with the orifice in the seat number 74' (FIG. 18). During this location of the parts, the mold is filled, but once filled, the back pressure moves the enlargement 86' into closing relation with the orifice in the member 74', and this closing operation initiates the exertion of a downward pressure on the piston 318, and in turn starts the reverse operation described immediately above where the piston rod 316 is moved upwardly to cause the valve piston to move to the left and into closing relationship with the outlet orifice 70'.

It has been found that under certain conditions it is particularly desirable to lock the bell crank arm in a position where it maintains the end 84' in closing relationship to the outlet orifice. This prevents air from entering the apparatus and interfering with the plastic being handled therein. For this purpose, the modification contemplates providing an auxiliary adjustable locking means 340 carried at the rear end of the support 106' by an auxiliary block 342. The auxiliary locking means includes a lock head 344 normally biased outwardly by means of a compression spring 346 disposed within a recess 348 of the block 342. A piston rod 350 extends from the piston head 344 into a recess 352 in a support 354 extending downwardly of the primary support 106'. The piston rod 340 carries a locking arm which engages within a recess 360 to maintain the piston head 344 in the retracted position shown. However, upon rotation of the piston head 344, and in turn the piston rod 350, the locking shaft 358 is released from the recess 360 thereby permitting the piston head 344 to move outwardly and engage the rear end 102' of the bell crank arm 100'. Locking the bell crank in this manner serves to fix the end 84' in the orifice 70' thereby closing communication from the atmosphere with the interior of the apparatus hereof.

To limit the rearward movement of the bell crank 100' during normal operation, it has also been found that it may be desirable to provide an auxiliary abutment such as the abutment screw 370 which, as shown, is threaded within a recess 372 provided on the support 106' adjacent the outlet valve means.

The abutment just described, as well as the regulating locking and maintaining means referred to immediately above, find particular utility when the apparatus accommodates molds having inlets of varying shapes and where it is desired to adjust the pressure within prescribed limits.

OPERATION OF THE HYDRAULIC FEEDING SYSTEM

Referring now to FIGURE 16, the operation of the hydraulic feeding system provided for the preferred modified embodiment hereof can be better understood. Initially, by referring to FIGURE 16, as well as to FIGURE 15, it will be noted that two 2-way valve assemblies 402 and 412 are incorporated. Each of these valve assemblies is essentially identical, and accordingly, the valve assembly 412 will be described only. Prime numerals have been used for corresponding elements of the valve assembly 402. In the valve assembly 412, the input fluid feeds through the coupling 214 and enters the orifice 431 pressing against the plunger-head 432 which normally closes the orifice 431 under the action of spring 433. Thus, when fluid is fed under pressure into the valve housing 430 for the assembly 412, the same unseats the head 432 so that the fluid can travel to the outlet coupling 212. Conversely, if fluid under pressure does not pass through the outlet coupling 212, the same engages the head 444 which normally closes the orifice 446 under the action of spring 445.

Bearing in mind the foregoing construction of the valve assembly 412, and correspondingly of the valve assembly 402, attention can be directed to the hydraulic system of the modified embodiment hereof.

Initially, fluid is fed under pressure through the inlet 214 form a suitable source of supply. This fluid travels through line 410 as well as through line 216. The line 410 is effectively closed since the head 432 of the valve assembly 412 closes the orifice 431. The path of least resistance for the fluid under pressure is, therefore, into the housing 200. The fluid passing into the housing 200 bears against the piston 202 thereby causing the entire feed section of the apparatus to slide forwardly and toward the mold. The compressive force of spring 433 is sufficient to overcome the fluid pressure required to cause the entire feed assembly to slide to the left as shown in FIGURE 15 and into a position where the nozzle engages the mold itself.

It will be remembered that the piston 202 is fixed relative to the other members, and accordingly, that as the fluid bears against the head of piston 202, the entire slide 220 moves. Once the slide 220 has reached its ultimate infeed position, i.e., once the nozzle has contacted the mold under sufficient pressure, then all of the pressure entering through the inlet 214 is applied against the head 432. This results in unseating such head and opening the orifice 431 in the valve assembly 412. Fluid under pressure then flows through the line 212 and into the branch lines stemming therefrom, namely, the branch lines 271 and 274 leading to the chamber 272 and the branch lines 271 and 276 leading to the chamber 140. Furthermore, the branch line 271 feeds directly to the housing 300 and the chamber therein. As a result of the feed through orifice 431 and valve assembly 412, the fluid is distributed and applied against the regulator piston 314, against the injection piston 134', and against the retraction control piston 270. Accordingly, the regulator is set to open the outlet regulating valve, the injection piston movement commences, and simultaneously, the arm 256 which controls the rearward movement of the scavenger piston 126' moves the scavenger piston forward.

When the assembly has completely filled the mold, the regulating valve serves to shut the system off as described above. Substantially simultaneously therewith, the abutment 500, which in this instance extends from the auxiliary piston 270, engages a forward limit switch 502. Engagement of the forward limit switch 502 serves to disconnect the inlet coupling 214 from the source of fluid pressure and to connect the inlet coupling 401 with the source of fluid pressure. Moreover, with this operation, coupling 214 is connected with a sump or reservoir so that fluid may drain therefrom. When fluid under pressure enters the coupling 401, it travels into line 400 and into the branch line 404. The valve head 444' in the valve assembly 402 against which the fluid acts is biased into closed position with respect to the orifice 446' under sufficient pressure that it does not become unseated at this moment. Instead, the fluid under pressure entering the line 401 acts against the left hand face of piston 134' initially thereby retracting such piston and causing it to move to its original position. Simultaneously with this movement, fluid is expelled through lines 276 and 212 into valve 412, whereupon the head 444 is unseated so that the fluid can pass into the line 410 and then out to the coupling 214.

It will be appreciated that at this time fluid can also drain from the housing 300 as well as from the housing 272 to the reservoir. The piston rod 128', as explained above, returns to its original position under the action of the material being fed within the transfer and injection chambers. With such movement, the scavenging piston 126' returns to its original position. Accordingly, no fluid under pressure is required to retract piston 270 or to specifically retract piston rod 128'. However, it should be noted that once piston 134' has returned to its original position, the pressure is again increased in line 400, and in this instance, sufficiently increased to unseat the valve head 444', whereupon fluid passes under pressure through orifice 446' and into the coupling line 406. This results in pressing against the right end of piston 202, but since the piston is stationary, the housing 200 is caused to move to reset the entire assembly to its original position, i.e., to slide the slide 220 to the right as shown in FIGURE 15, thus freeing the nozzle movable therewith from engagement with the mold components.

It should be appreciated from the foregoing that when a repeat operation is desired, and fluid under pressure is fed through the coupling 214, the fluid behind the piston 202 is exhausted through the coupling line 406, and in turn unseats the head 432' which cooperates with the orifice 431'. In other words, during the initial operation, head 432' of the valve assembly 402 is unseated, whereas during the return operation, the valve head 444' of the valve assembly 402 is unseated. In a similar fashion, during the initial operation, the valve head 432 of the valve assembly 412 is unseated, whereas during the return operation, the valve head 444 of the valve assembly 412 is unseated. The biasing pressures applied to the respective valve heads by the respective springs in the valve assembly are so adjusted that the valves are not operative until the desired pressure increase is obtained as a result of the selective movements.

OPERATION OF THE PREPLASTIFICATION, FEEDING, CLOSING, AND INJECTION ASSEMBLIES

Preplastification assembly

The preplastification assembly, generally indicated at 600 in FIGURE 20, is operated in the following manner: Electric Motor 401' is actuated to drive pump 502 for the delivery of hydraulic fluid to conduit 505. The fluid is supplied to the pump through filter 500' from tank 504. Hydraulic motor 506 is connected as shown to conduit 505, and received fluid therefrom. The fluid drives motor 506 and in turn drives the rotating preplasticising screw through a reduction gear assembly (not shown, but preferably of 1:17 ratio). The hydraulic motor 506 operates at a given speed when supplied with a given quantity of fluid (e.g. 36 litres per minute) through conduit 505 by the pump 502. To control this speed, however, an adjustable regulating valve 507 is connected in conduit 505 whereby fluid in varying quantities can be by-passed from the motor 502 back to the reservoir 504. Thus, by adjusting the regulating valve 507 to by-pass different quantities of fluid from the conduit 505, the amount of fluid supplied to the hydraulic motor 506 is regulated and the resultant rotational speed thereof can be varied. The speed is, in other words, proportional to the amount and/or rate of fluid fed directly to motor 506 and not by-passed through valve 507.

A second by-pass valve 509, controlled by electro-vane pilot controller 508, is also connected as shown in the conduit 505 whereby actuation of the valve 509 by the controller 508 will result in by-passing to the reservoir 504 substantially all the fluid supplied to the conduit 505 by the pump 502. This action will stop hydraulic motor 506.

With the provision of the two valve assemblies 507 and 509, there is a dual control over the operation of hydraulic motor 506. In essence, valve 507 is the primary speed adjustment control and valve 509 is primarily an "on-off" control operating under the influence of the electrical pilot 508.

Feeding assembly

The feeding, closing and force applying assemblies are operated from a common hydraulic system separate from that used for the pre-plasticising assembly except for a common reservoir. More particularly, to feed the closing, force applying, and injection assemblies, generally indicated at 602, 603 and 604 respectively in FIGURE 20, electric motor 510 is actuated to simultaneously drive a low pressure pump 511 and a high pressure pump 512.

Pump 511 is connected, as shown to conduit 513 and valve 514 and by-pass valve 519 are connected in series relation to this conduit. The by-pass valve 519 is adjusted to open at a pressure lower than that at which fluid is discharged from pump 511. Thus, so long as the hydraulic pressure at junction 517 is lower than the pressure at which valve 519 is adjusted to open (as for example when the machine closing valve is actuated to operate the movable platen to thereby reduce pressure in the conduit), the valve 519 remains closed and no fluid is by-passed therethrough from the pump 511 to the reservoir 504. However, as soon as the pressure at junction 517 exceeds the by-pass pressure of the valve, the latter is opened to by-pass the output of pump 511 from conduit 513 back to the reservoir 514. One way valve 514 will prevent the output of pump 512 from being similarly by-passed. It is to be noted, however, that the by-passing of the output pump 511 will occur almost immediately after operation of the machine has commenced. Accumulator 524 is connected, as shown, in conduit 540 and pressurized to the by-pass pressure of valve 519, whereby operating pressure for the injection assembly will temporarily be maintained in conduit 540 should either or both of the pumps 511 or 512 fail.

Pressure limit valve 516 is connected, as shown in conduit 515 to by-pass the output of pump 512 back to the reservoir after the pressure in the accumulator has reached the prescribed level. The movable platen of the machine is connected to the two cylinders A and B. Cylinder A is utilised to perform the platen closing operation, while both cylinders A and B are utilised to perform the platen opening operation. For the latter operation, the cylinders are fed together from conduits 534 and 534'.

Closing assembly

The closing assembly 602 operates as follows: Electrovalve 526 which is connected to conduits 518 and 525 serves to feed conduit 530, which through its connection with cylinder A, controls the closing operation of the moulds through the hydraulic piston A'. Such piston moves the movable platen of the machine toward the closed position. Upon initiation of the closing operation, the pressure is immediately decreased on account of the large consumption in the conduit 518. The accumulator 524 cannot feed this conduit because of the one way valve 520. The decrease in pressure in conduit 518, and consequently at junction 517, closes valve 519 whereby the output of the low pressure pump 511 will no longer be by-passed to the reservoir. Thus, the outputs of pumps 511 and 512 will be simultaneously and cumulatively fed through adjustable throttle valve 529 in conduit 530 to the cylinder A. The adjustable throttle valve 529 permits a speed regulation of movement of piston A' within the cylinder A, thus providing adjustment of closing speed. When the two sections of the mould are in contact (i.e. when piston A' is at the end of its forward stroke), the hydraulic pressure increases very quickly and in conduit 518, and the output of the low pressure pump 511 is by-passed to the reservoir by valve 519 which is responsive to the pressure change. At the same time, an electric contact activated by the platen of the machine, actuates the electrovalve 526 connected in conduit 535. The fluid flowing through such valve passes to the one way valve 538 and then to the force multiplying devices 539. It is to be noted that if a failure of the electric circuit occurs at this moment, the multiplying devices 539 will remain blocked (and it is important that they remain so) because the one way valve 538 will stop the return of the fluid then contained in the multiplying devices.

It should here be also noted that valves 529 and 538, described above, and valve 541, described below, as electro-valves, can be of any suitable form. In specific terms, each of these valves is preferably a so called "4-way valve" which is solenoid activated to selectively move between two different positions establishing selective fluid flows therethrough in accordance with the operation described herein.

When opening of the platen is desired, the electro-valve 526 should be activated to its second position. With such activation, the pilot line 537 will then open valve 538 to by-pass the fluid from the multiplying devices back to the reservoir. When the force multiplying devices are back at their original positions (i.e. when their piston are retracted), an electric current is automatically fed to the electro-valve 526 to move the same to its other position. This results in moving piston A' rearwardly by fluid passing through valve 533. The valve 533 thus enables the regulation of the opening speed of the piston. The fluid being fed through valve 533 results in fluid being fed through line 534 as well as line 534', so that both pistons A' and B' are positively moved to retracted positions. At the end of the return strokes of pistons A' and B', the pressure in the conduits will again be significantly changed whereby valve 519 will again open. For safety purposes, oneway valves 532 and 529' are coupled in parallel positions to valves 533 and 529 respectively.

Injection assembly

This assembly is fed by accumulator 524. However, the high pressure pump 512 can also feed the injection assembly through conduit 540 and one-way valve 520. When electro-valve 541 receives fluid, the fluid is fed on through conduit 544 to actuate the pistons D and D' which move the injection block so as to have the injection nozzle at the extreme end of the injection block in contact with the mould. When the block is moved to its final position, the hydraulic pressure increases in the conduit 545 and the control valve 546 operates to direct the fluid through conduit 549 to the reservoir. By adjusting the operating pressure of valve 546 the contacting pressure of the nozzle on the mould can be adjusted to a sufficient pressure such that (a) plastic material will be prevented from escaping and (b) the pressure is not so high as to result in deformation of injection block components. Under the control of valve 546 which is connected to the reservoir, the pressure on pistons D and D' is always approximately the same after final position is reached so that the nozzle is correctly positioned, even if the length of the injection block varies during the operation due to variations in temperature.

PRACTICAL ADVANTAGES AND STRUCTURAL CONSIDERATIONS

One of the main advantages of the injection mold feeding apparatus herein disclosed is its compactness and relative simplicity in structure as regards the forces it can exert during its operation. For example, assume that the apparatus is used for molding articles with weight of the order of 3 kilograms. The injection piston 134 can exert a thrust of 70 tons. With the three auxiliary abutment pistons 156 having a total cross-section of 15 sq. cm. and with the pressure chamber 150 subjected to a pressure of 200 kg. per sq. cm., the auxiliary pistons will exert a total thrust of 3 tons, assuming the bore of the chambers 60, 61 in vessel 62, has a cross-section of 130 sq. cm., and the piston rod 128 has a cross-section of 30 sq. cm. The worm 64 forces the plasticized material into the transfer chamber 60 with a force of 50 kg. per sq. cm. At the end of the injection movement of the piston and piston rod members 174, 128, the thrust exerted by piston 134 produces within the plastic material in the injection chamber 61 a pressure of approximately 540 kg. per sq. cm. Since the effective area of the scavenging piston 126 is equal to the difference between the cross-section of transfer chamber 60 and piston rod 128 (130 sq. cm.—30 sq. cm.=100 sq. cm.) the scavenging piston 126 is thus subjected, by the plastic material contained in transfer chamber 60, to a thrust of 100 x 5 tons which is obviously greater than the 3 ton thrust of the three auxiliary abutment pistons. This example is applied to the embodiment of FIGURES 1–12, although it is equally applicable to the modified embodiment.

In addition to contacts 162, 164, safety contacts may be advantageously provided to operate in the event of defective operation of the mold ejectors, or in the event the electric or hydraulic circuits associated with the apparatus fail to function. However, with the modified embodiment, the electrical system is simplified to a minimum.

Consistent with the above described embodiments, the following results can be appreciated:

(1) The invention, as disclosed, provides an efficient and relatively simple plasticized molding material injection-transfer apparatus in conjunction with an improved extrusion molding machine free of defects and deficiences.

(2) Said invention provides injection-transfer apparatus for feeding plasticized material through an injection nozzle wherein the operation of all movable components of the apparatus is uninterrupted and continuous and wherein means are provided for automatically controlling the feeding of the plasticized material in conformity with the pressure obtained at the injection nozzle.

(3) Said injection-transfer apparatus and said injection nozzle provide movable components driven in continuous motion by power means and having regulator means directly responsive to both the pressure of the plasticized material at the injection orifice and the power means for effecting the flow of such material through said injection orifice.

(4) Said injection apparatus for feeding plasticized material through an outlet orifice and having flow control means responsive to the pressure of the plasticized material at said outlet orifice is capable of forming relatively heavy articles wherein the injection feeding apparatus is relatively small and compact and develops relatively high injection pressures at a relatively low expenditure of energy.

(5) Said injection feeding apparatus and said injection nozzle include a continuously rotatable extrusion worm continuously feeding the plasticized material to variable volume transfer and injection chamber means, so that the apparatus maintains the material at uniform consistency and free of defects when injected to the mold from said nozzle.

(6) Said apparatus and its continuous motion plastic feeding means provide for automatic regulation of the flow of the material at the nozzle by its pressure and automatic repeating of cycle operations.

(7) The rotatable extrusion worm means in said molding apparatus is maintained in continuous rotation throughout the entire mold injection operations while the transfer and injection chamber means are simultaneously and continuously varied in volume with respect to a feeding passage between them which is successively opened and closed during the extruding operation.

(8) Said mold feeding system co-acts with transfer and injection chambers and with the extrusion worm means, to achieve a maximum pressure in the transfer chamber in the direction of the extruding operation when the volume of the transfer chamber is increasing.

(9) Said feeding system provides for automatic regulation and control of the molding plastic material as the material flows from the outlet of said feeding system to the molding machine.

(10) Said improved molding machine permits the use of relatively small and compact force applying units for holding the mold components closed during the injection feeding operation, as well as during the injection feeding apparatus and for actuation of the entire system.

(11) Said improved molding machine can easily be rendered suitable to accommodate molds of varying sizes and shapes requiring different injection volumes, timing cycles, and/or other variable characteristics.

(12) Said improved molding machine incorporates an easily manually adjustable assembly for readily varying the injection feed of the machine within predetermined limits affording a substantial range of adjustment.

(13) Said injection molding machine incorporates an injection transfer and feed mechanism which is easily mounted for sliding movement, through the use of an efficient hydraulic network, reciprocally of a mold with which it is to cooperate.

(14) The injection transfer, the feed mechanism and the positioning means of the machine are all actuated in timed relation by a common source of power and a common hydraulic pressure system, thus achieving the ultimate in operation simplicity.

The apparatus acording to the present invention obtains inter alia the following advantages in this process of injection-transfer molding:

(a) Since the apparatus is continuous in its functioning, it is unnecessary at any moment to halt the rotation of the extrusion worm. By varying the ratio of the motor-reduction gearing assembly, it is possible to adjust the speed of rotation of this worm to the exact value corresponding to the optimum molding tempo permitted by the plastification depending upon a number of parameters such as the heating power, the nature of the plastic material and the weight and shape of the molded pieces. Once the rotational speed has been regulated, the operations follow one another automatically under optimum conditions.

(b) It is possible to reduce the injection temperature, reduce the cooling time and raise the molding tempo; in fact the regulation effected by the plastic material and the usual hydraulic regulators, which produce harmful pressure losses are eliminated; and the hydraulic circuit, by reason of its simplicity, permits very rapid injection feeding.

(c) The molecular friction normally produced by the rotation of the extrusion worm contributes within the plastic material to the heating of the said material. The rotation of the worm being continuous, the plastification is improved. The molding cycle accordingly can be more rapid.

(d) The continuous rotation of the extrusion worm favors homogenization of the plastic material.

(e) As the transfer chamber is subjected as a whole at each cycle to the action of the scavenging piston, stagnation of the plastic material is avoided, because the material always flows continuously in the same direction from the extrusion worm towards and into the mold.

(f) As the scavenging piston is subjected during the entire duration of the injection cycle to the action of the auxiliary pistons, the transfer chamber is constantly maintained under pressure, even when the movable part advances. This prevents re-entry of air into the said chamber and insures the production of clean moldings devoid of air bubbles or cavities.

(g) The leakage of plastic material which occurs in conventional machines during the injection feeding as a result of the annular clearance of the injection piston in the injection chamber causes the flow of a part of the plastic material to the exterior. Even if this should occur in applicant's disclosed apparatus, it would have no harmful effect, since the leakage flow would then merely aid in re-supplying the transfer chamber.

(h) The apparatus can be easily closed by simple adjustment of the regulator actuation lever to shut off communication between the interior of the apparatus and the atmosphere.

(i) The apparatus is adapted to be operated by a simple hydraulic system incorporating for selective control only two double acting valves in the feed lines of the apparatus.

While the invention has been described, disclosed, illustrated and shown in terms of preferred embodiments which it has assumed in practice, the scope of the invention should not be deemed to be limited by the precise embodiments herein described and illustrated since other embodiments or modifications are intended to be reserved as they fall within the claims hereto appended.

What is claimed is:

1. In a device for controlling the flow of mold material through an injection molding machine, comprising a nozzle defining a chamber having a pair of orifices, one of which admits mold material to the chamber from a source of mold material and the other of which permits the mold material to exit from the chamber to a mold cavity, a valve in said chamber for selectively closing off said orifices, and a control means for engaging and operating said valve, said control means including one plunger having an operative position for maintaining said valve in an intermediate position between said orifices to permit flow of mold material through both said orifices, and another plunger movable to an operative position for moving said valve to a position to close off said other orifice to prevent flow of mold material therethrough, a lever between said valve and said plungers, hydraulic means for operating said plungers to engage said lever such that when one plunger is in an operative position the other is in an inoperative position and means for adjusting the position of said one plunger along said lever to vary the leverage and effective force offered by said one plunger against said lever in opposition to the pressure of the mold material in said chamber acting on said valve.

2. In a device as set forth in claim 1, wherein said control means comprises a housing having cylinder means in which said plungers operate, said cylinder means receiving fluid under pressure from a common source, said other plunger being biased to an extended operative position by a spring in said cylinder means and being moved from its operative position by the fluid under pressure in said cylinder means, said one plunger being extended to its operative position by said fluid under pressure in said cylinder means and being retracted from its operative position when the force transmitted to the said one plunger by the back pressure of mold material acting on the valve exceeds a predetermined value.

3. In an injection molding machine, the combination comprising a nozzle adapted to introduce mold material into a mold cavity, a valve means in said nozzle having opposed valve inlet and outlet orifice seats and a valve member, said valve means being responsive to the back pressure resulting from a filled condition of said mold cavity to urge the valve member against one of said inlet seat to interrupt the flow of moldable material to said mold, fluid pressure means for urging said valve member to a position intermediate said valve seats and including means operable upon the absence of hydraulic fluid pressure to move said valve member against said outlet seat to close the nozzle connection with said mold, and means for adjusting the fluid pressure means to thereby adjust the force provided by said fluid pressure means to accommodate different pressures in the moldable material resulting from use of different volumes of molded pieces.

4. In an injection molding machine, the combination comprising a nozzle adapted to introduce mold material into a mold cavity, a valve means having a valve member and a valve set in said nozzle, said valve means comprising responsive means responsive to the pressure of the moldable material in said mold cavity for urging said valve member upon said seat to interrupt the flow of fluid to said cavity, a bell-crank lever having one arm in engagement with said valve member for urging said valve member off of its seat, hydraulic means engaging said other arm of said bell-crank lever providing a force thereon to urge said valve means to a position wherein said valve member is spaced from said valve seat, and means for adjustably positioning said hydraulic means along said other arm of said bell-crank lever to accommodate different pressures in the moldable material arising from use of different size molds and to assure the proper position of the valve member relative to its seat.

5. A device for controlling the flow of mold material through an injection molding machine, comprising a nozzle for introducing mold material from a source into a mold cavity, a valve in said nozzle for selectively closing the flow of mold material through said nozzle, and a control means for engaging and operating said valve, said control means comprising one plunger having an operative position for maintaining said valve in an open position to permit flow of mold material through said nozzle, and another plunger movable to an operative position for moving said valve to a position to close off said nozzle to prevent flow of mold material therethrough, said plungers being operated such that when one plunger is in an operative position the other is in an inoperative position, said control means comprising a lever between said valve and said plungers, said plungers being hydraulically operated to separatively engage said lever, said control means further comprising means for adjusting the position of said one plunger to vary the effective force offered by said one plunger in opposition to the pressure of the mold material in said chamber acting on said valve.

6. A device according to claim 5 wherein said control means further comprises a housing in which said plungers are carried, said housing having means for admitting a common source of fluid under pressure for causing operation of said plungers such that when the fluid is admitted under pressure to the housing, said one plunger is retracted from its operative position, and when the pressure of fluid to the plungers is decreased, said one plunger will be retracted from its operative position and the other plunger will be extended to its operative position.

7. A device for controlling the flow of mold material through an injection molding machine, comprising a nozzle for introducing mold material from a source into a mold cavity, a valve in said nozzle for selectively closing the flow of mold material through said nozzle, and a control means for engaging and operating said valve, said control means comprising one plunger having an operative position for maintaining said valve in an open position to permit flow of mold material through said nozzle, and another plunger movable to an operative position for moving said valve to a position to close off said nozzle to prevent flow of mold material therethrough, said plungers being operated such that when one plunger is in an operative position the other is in an inoperative position, said control means further comprising a pivotally supported bell-crank lever having one arm operatively engaging said valve and another arm operatively engaged by said plungers one at a time depending on which plunger is in its operative position, said control means also comprising means for adjusting said plungers along said other arm to vary the effective moment arm between the pivot of the bell-crank lever and the engagement of the plungers with said other arm.

8. A regulating device for controlling the operation of an injection valve of a molding machine, comprising a nozzle having a passageway including an inlet and an outlet for connection to a mold cavity, a valve disposed in said passageway between said inlet and outlet, a lever having one arm engaging said valve and a second arm engaged by a control means, said control means including two pistons, one of said pistons when extended engaging said second arm to move said valve to open said inlet, the other of said pistons when extended engaging said arm to move said valve to close said outlet, and fluid pressure means operative to extend and retract said pistons.

9. A regulating device according to claim 8 wherein said fluid pressure means comprises a common source of pressure fluid and means connecting said source to said pistons in such manner as to extend one piston while simultaneously retracting the other piston.

10. A regulating device according to claim 8 wherein said lever is a bell-crank and said two pistons engage said second arm at different distances from the lever fulcrum.

11. A regulating device according to claim 8 wherein said control means further comprises a housing having two cylinder cavities, said one piston includes a head movable in one of said cavities and having a rod protruding therefrom for engagement with said second arm of the lever, said other piston being a hollow sleeve, and a fluid inlet to said housing and cavities to direct pressure fluid to advance said piston head in one direction and retract said piston sleeve in the opposite direction.

12. A regulating device according to claim 11 wherein a spring is disposed within said hollow sleeve and biasing the sleeve to oppose the retraction movement caused by pressure fliud.

13. In a device for controlling the flow of mold material through an injection molding machine, comprising a nozzle defining a chamber having a pair of orifices, one of which admits mold material to the chamber from a source of mold material and the other of which permits the mold material to exit from the chamber to a mold cavity, a valve in said chamber for selectively closing off said orifices, and a control means for engaging and operating said valve, said control means comprising one plunger having an operative position for maintaining said valve in an intermediate position between said orifices to permit flow of mold material through both said orifices, and another plunger movable to an operative position for moving said valve to a position to close off said other orifice to prevent flow of mold material therethrough, means for operating said plungers such that when one plunger is in an operative position the other is in an inoperative position, a pivotally supported bellcrank lever having one arm operativley engaging said valve and another arm operatively engaged by said plungers one at a time depending on which plunger is in its operative position, and means for adjusting said plungers along said other arm to vary the effective moment arm between the pivot of the bellcrank lever and the engagement of the plungers with said other arm.

14. In an injection molding machine, the combination comprising a nozzle having an inlet and an outlet adapted to introduce mold material into a mold cavity, a valve in said nozzle, fluid pressure means urging said valve in one direction to open said inlet, a face on said valve which when subjected to pressure of mold material in said nozzle urges said valve to move in the opposite direction toward closing said inlet, and additional biasing means operative upon reduction of fluid pressure in said fluid pressure means to move the valve to close said outlet.

15. The combination according to claim 14 wherein said additional biasing means comprises a spring mounted in a hollow piston subject to fluid pressure in said fluid pressure means.

16. The combination according to claim 15 wherein said fluid pressure means comprises a housing having a pair of cylinder cavities communicating with each other by a duct, said hollow piston being slideably mounted in one of said cavities, a second piston mounted in said other cavity, a lever having one arm engaging said valve and said two pistons being engageable with a second arm on said lever at different distances from its fulcrum.

17. The combination according to claim 14 wherein said fluid pressure means comprises a lever having one arm engaging said valve, a second arm on said lever, a fluid pressure cylinder having an opening at one end adjacent said second arm, a spring in said cylinder, a piston having a head engaging said spring and a rod extending in the opposite direction, a hollow piston slideable in said cylinder and slideably receiving said rod, a pressure fluid entry conduit disposed to drive said piston and hollow piston in opposite directions, both said hollow piston and rod being operative at different times to protrude through said cylinder opening to engage and move said second arm of the lever.

18. In an injection molding machine, the combination comprising a nozzle having an inlet and an outlet adapted to introduce mold material into a mold cavity, a valve means in said nozzle, a face on said valve means which when subjected to pressure of mold material in said nozzle urges said valve means in a direction toward closing said inlet, fluid pressure means including a piston means and a bellcrank lever having one arm in engagement with said valve means and another arm engaged by said piston means, said piston means applying an opposing force through said bellcrank lever to said valve means urging the valve means toward closing said outlet, and means for adjusting the position of said piston means along said other arm to vary the effective moment arm of said piston means on said other arm relative to the pivot axis of said bellcrank lever, thereby adjusting said opposing force being offered to said valve means.

19. The combination with a mold feeding apparatus having an injection nozzle including an inlet and an outlet adapted for connection to a mold cavity, a mold input regulating valve in said nozzle having a mold material pressure face urging the valve to close said inlet and an operating arm extending therefrom, an operating arm fluid pressure control means including a housing, first piston means within said housing for biasing said arm to open said inlet, and second piston means coaxial with said first piston means for biasing said arm to close said outlet.

20. The combination according to claim 19 wherein said fluid pressure control means includes means for operating said pistons by a common source of fluid pressure such that when one piston is extended to engage said operating arm, the other piston is retracted and disengaged from said operating arm.

21. The combination according to claim 19 wherein is additionally provided means for locking said operating arm in its position closing said outlet.

References Cited by the Examiner

UNITED STATES PATENTS

| | | | |
|---|---|---|---|
| 863,366 | 8/1907 | Dick | 18—43 |
| 1,136,696 | 4/1915 | Miller | 251—319 |
| 1,368,229 | 2/1921 | Chrisman | 251—231 |
| 2,053,072 | 9/1936 | Farmer | 251—231 |
| 2,420,709 | 5/1947 | Kopplin | 18—43 |
| 2,535,436 | 12/1950 | Maynard | 264—328 |
| 2,738,551 | 3/1956 | Howald | 264—328 |
| 2,892,214 | 6/1959 | McCarthy | 18—30 |
| 2,980,137 | 4/1961 | Selwood | 251—231 |
| 2,983,956 | 5/1961 | Vogel et al. | 18—30 |

FOREIGN PATENTS

| | | |
|---|---|---|
| 1,150,189 | 10/1957 | France. |
| 1,104,684 | 4/1961 | Germany. |

J. SPENCER OVERHOLSER, *Primary Examiner.*

ALEXANDER H. BRODMERKEL, WILLIAM J. STEPHENSON, *Examiners.*

J. R. DUNCAN, W. L. McBAY, *Assistant Examiners.*